United States Patent
Agarwal et al.

(10) Patent No.: US 7,157,886 B2
(45) Date of Patent: Jan. 2, 2007

(54) POWER CONVERTER METHOD AND APPARATUS HAVING HIGH INPUT POWER FACTOR AND LOW HARMONIC DISTORTION

(75) Inventors: Vivek Agarwal, Mumbai (IN); Victor Prince Sundarsingh, Mumbai (IN); Serge Bontemps, Pessac (FR); Alain Calmels, Talence (FR)

(73) Assignee: Microsemi Corp. —Power Products Group, Bend, OR (US)

( * ) Notice: Subject to any disclaimer, the term of this patent is extended or adjusted under 35 U.S.C. 154(b) by 344 days.

(21) Appl. No.: 10/689,863

(22) Filed: Oct. 20, 2003

(65) Prior Publication Data

US 2004/0136208 A1    Jul. 15, 2004

Related U.S. Application Data

(60) Provisional application No. 60/420,193, filed on Oct. 21, 2002.

(51) Int. Cl.
*G05F 1/70* (2006.01)

(52) U.S. Cl. .......................................... 323/207; 363/17
(58) Field of Classification Search ................. 323/207; 363/17, 131
See application file for complete search history.

(56) References Cited

U.S. PATENT DOCUMENTS 5,302,858 A    4/1994 Folts
5,841,641 A * 11/1998 Faulk ....................... 363/21.14

FOREIGN PATENT DOCUMENTS

CN         01140014.5       11/2001

OTHER PUBLICATIONS

Schlecht, M.F. and Miwa, B.A., "Active power factor correction for switching power supplies," IEEE Transactions Power Electronics, vol. 2, No. 4, pp. 273-281, 1987, no month.
Akagi, H., "Trends in active power line conditioners," IEEE Transactions on Power Electronics, vol. 9, pp. 263, May 1994.
Redl, R.; Balogh, L. and Sokal, N., "A new family of single stage isolated power factor correctors with fast regulation of the output voltage," IEEE Power Electronics Specialists Conference, pp. 1137-1144, 1994, no month.

(Continued)

*Primary Examiner*—Shawn Riley
(74) *Attorney, Agent, or Firm*—Marger Johnson & McCollom, P.C.

(57) ABSTRACT

A single stage, single switch, input-output isolated converter configuration which uses a hybrid combination of forward and flyback converters is disclosed. The converter operates at a high input power factor with a regulated DC output voltage. It makes use of a novel control scheme utilizing duty cycle control at two discrete operating frequencies. Although the invention employs two frequencies, it does not use a continuous frequency variation. This configuration has the advantage of reduced peak current stresses on the components and is specifically suited for 'buck' applications where low DC output voltages (e.g. 24V, 48V) are needed. This configuration will be of specific interest to industries associated with battery charging and uninterruptible power supply (UPS) systems. Apart from having several competitive features compared with prior art techniques, the dual frequency operation scheme reduces the amplitude of its noise spectrum by spreading it over a wider frequency range thus making it more electromagnetic compatible.

56 Claims, 15 Drawing Sheets

Power Factor and Output Voltage Control with Over Current Protection

OTHER PUBLICATIONS

Erickson, R.; Madigan , M. and Singer, S., "Design of a simple high-power-factor rectifier based on the flyback converter," IEEE Applied Power Electronics Conference and Exposition, pp. 792-801, 1990, no month.

Prasad, A.R.; Ziogas, P.D. and Manias, S. ,"A new active power factor correction method for single phase buck boost AC—DC converter," Proceedings of APEC, pp. 814-820, 1992, no month.

Yang, Eric X.; Jiang, Y. ; Hua, G. and Lee, F.C., "Isolated boost circuit for power factor correction," Proceedings of APEC, pp. 196-203, 1993, no month.

Kheraluwala, M. ; Steigerwald, R. and Gurumoorthy, R., "A fast response high power factor converter with a single power stage," IEEE Power Electronics Specialists Conference, pp. 769-779, 1991, no month.

Daniele, Matteo ; Jain, Praveen K. and Joos, Geza, "A single-stage power-factor-corrected AC/DC converter," IEEE Transactions on Power Electronics, vol. 14, No. 6, pp 1046-1055, Nov. 1999.

Wei, H.; Batarseh, Issa; Zhu, G. and Kornetzky, P., "A single-switch AC-DC converter with power factor correction," IEEE Trans. on Power Electronics, vol. 15, No. 3, pp. 421-430, May 2000.

Tacca, H.E., "Power Factor Correction using merged flyback-forward converters," IEEE Transactions on Power Electronics, vol. 15, No. 4, pp. 585-594, Jul. 2000.

Jovanovic, M.M. ; Tsang, D.M.C. and Lee, F.C., "Reduction of voltage stress in integrated high quality rectifier regulators by variable frequency control," Proceedings of Applied Power Electronics Conference (APEC), pp. 569-575, 1994, no month.

Bontemps, Serge and Grafham, Denis, "Low-loss resonant gate drive saves energy and limits EMI in 3.5kW hard-switched PFC boost-converters," PCIM 2002 (Europe), Nuremberg, Germany, no month.

Joshi, Madhuwanti and Agarwal, Vivek , "EMI mitigation in power electronic circuits operating at high power factor," Proceedings of the IEEE International Conference on Industrial Technology 2000, Goa India, pp. 267-271, no month.

Shet, V.N., "Power Factor Correction in Power Converters," Ph.D. Dissertation, Dept. of Electrical Engineering, IIT-Bombay, 2002, no month.

Stratford, R.P., "Rectifier harmonics in power systems," IEEE Trans. Ind. Appl. vol. IA-16, pp. 271-276, 1980, no month.

Shepherd, W. ; Zand, P., "Energy flow and power factor in nonsinusoidal circuits," (London: Cambridge University Press), 1979, no month.

Schwarz, F.C. , "A time-domain analysis of the power factor for a rectifier filter system with over and subcritical inductance," IEEE Trans. Ind. Electron. Control Instrum., IECI-20(2), pp. 61-68, 1973, no month.

Vorperian, V.; Ridley, R., "A simple scheme for unity power-factor rectification for high frequency AC buses," IEEE Trans. Power Electron 5, pp. 77-87, 1990, no month.

Jain, P. , "A unity power factor resonant AC/DC converter for high frequency space power distribution system," IEEE Power Electron. Spec. Conf., Rec. 1, 1994.

Prasad, A.R.; Ziogas, P.D.; Manias, S., "A novel passive waveshaping method for single phase diode rectifiers," IEEE Trans. Ind. Electron., IE-37, pp. 521-530, 1990, no month.

Lai, Jih-Sheng ; Hurst, D.; Key, T., "Switch mode power supply power factor improvement via harmonic elimination methods," IEEE Appl. Power Electron. Conf., Rec., pp. 415-422, 1991, no month.

Prasad, A.R.; Ziogas, P.D.; Manias, S., "A Comparative evaluation of SMR converters with and without active input waveshaping," IEEE Trans. Ind. Electron. IE-35(3), pp. 461-468, Aug. 1988.

Mohan, N. ; Undeland, T.M., Ferraro, R.J.,"Sinusoidal line current rectification with a 100kHz BN-SIT step up converter," IEEE Power Electron. Spec. Conf., Rec., pp. 92-98, 1984, no month.

Enjeti, P.N.; Martinez, R., "A high performance single phase AC to DC rectifier with input power factor correction," IEEE Appl. Power Electron. Conf., Rec., pp. 196-203, 1993, no month.

Dawande, M.S.; Dubey, G.K., "Bang bang current control with predecided switching frequency for switch mode rectifiers," IEEE Power Electron Drives Syst. Conf., Rec., pp. 538-542, 1995, no month.

Zhou, C.; Ridley, R.B.; Lee, F.C., "Design and analysis of hysteretic boost power factor correction circuit," IEEE Power Electron. Spec. Conf., Rec., pp. 800-807, 1990, no month.

Spangler, J.J. ; Behera, A.K. , "A comparison between hysteretic and fixed frequency boost converters used for power factor correction," IEEE Appl. Power Electron. Conf., Rec., pp. 281-286, 1993, no month.

Tang, W. ; Lee, F.C. ; Ridley, R.B.; Cohen, I. , "Charge control : Modeling, analysis and design," IEEE Power Electron. Spec. Conf., Rec., pp. 503-511, 1992, no month.

Tang, W. ; Jiang, Y.M.; Hua, G.C.; Lee, F.C.; Cohen, I., "Power factor correction with flyback converter employing charge control," IEEE Appl. Power Electron. Conf., Rec., pp. 293-298, 1993, no month.

Endo, H.; Yamashita, T. ; Sugiura, T., "A high power factor buck converter," IEEE Power Electron. Spec. Conf., Rec., pp. 1071-1076, 1992, no month.

Maksimovic, D.; Erickson, R., "Universal-input, high-power-factor, boost doubler rectifiers," IEEE Appl. Power Electron, Conf., Rec., pp. 459-465, 1995.

Mwinyiwiwa, Bakari M.M.; Birks, P.M.; Ooi, Boon-Teck, "Delta-modulated buck-type PWM converter," IEEE Trans. Ind. Appl. 28, pp. 552-557, 1992, no month.

Ooi, Boon-Teck; Mwinyiwiwa, Bakari M.M.; Wang, X., Joos, G., "Operating limits of the current-regulated delta-modulated current-source PWM rectifier," IEEE Trans. Ind. Appl., 38, pp. 268-274, 1991, no month.

Todd, P.C., UC 3854, "Controlled power factor correction circuit design," Unitrode-Product Applications Handbook, Lexington, MA, 1993-94, no month.

Oruganti, R. and Palaniapan, M., "Inductor voltage controlled variable power factor buck—type AC-DC converter," Proceedings of Power Electronics Specialists Conference (PESC), pp. 230-237, 1996, no month.

Oruganti, R. and Srinivasan, Ramesh, "Single phase power factor correction—A review," Sadhana, vol. 22, part 6, pp. 753-780, 1997, no month.

Prasad, A.R. , Ziogas, P.D., Manias, S. , "A novel passive waveshaping method for single phase diode rectifiers," IEEE Tran. Ind. Electron., IE-37, pp. 521-530, 1990, no month.

Takahashi, I., Igarashi, R.Y., "A switching power supply of 99% power factor by the dither rectifier," IEEE International Telecommunication Energy Conference Record, pp. 714-719, 1991, no month.

Madigan, M.; Ericson, R.; Ismail, E., "Integrated high quality rectifier regulators," IEEE Power Electronic. Spec. Conference, pp. 1043-1051, 1992, no month.

Elmore, M.S. ; Peterson, W.A.; Sherwood, S.D., "A power factor enhancement circuit ," IEEE Applied Power Electron. Conf. Record, pp. 407-414, 1991, no month.

Agarwal, Vivek; Sundarsingh, V. P.; Bontemps, Serge and Grafham, Denis, "A Smart Power Converter Module for Buck Applications Operating at High Input Power Factor," Proceedings of the 28th Annual Conference on Industrial Electronics, Control and Instrumentation (IECON), Sevilla, Spain, pp. 858-863, 2002, no month.

Agarwal, Vivek ; Sundarsingh, V.P.; Bontemps, Serge; Calmels, Alain and Grafham, Denis , "Novel single-switch isolated 42V/1kW battery charger module uses converter operating at near-unity Power Factor," Proceedings of PCIM-2003, Nuremberg, Germany, May 20-22, 2003, no month.

Umanand, L. and Bhat, S.R. , "Design of magnetic components for switched mode power converters", First Edition, Willey Eastern Limited, 1992, no month.

Zhang, Y.F.; Yang, L. and Lee, C.Q., "EMI reduction of power supplies by Bi- Frequency modulation," Proceedings of the Ninth Annual Applied Power Electronics Conference and Exposition, pp. 601-607, 1994, no month.

Garcia, O.; Cobos, J.A.; Alou, P.; Prieto, R.; Uceda, J. and Ollero, S., "A New Family of Single State AC/DC Power Factor Correction Converters with Fast Output Voltage Regulation," Power Electronics Specialists Conference, 1997, PESC '97 record, 28th annual IEEE, St. Louis, MO, Jun. 22-27, 1997, New York, NY IEEE, US Jun. 22, 1997, pp. 536-542.

Nagao, Michihiko, "One Stage Forward-Type Power Factor Correction Circuit," Power Electronics Specialists Conference, 1997, PESC '97 Record, 28th Annual IEEE, St. Louis, MO, June 22-27, 1997, no month.

European Committee for Electrotechnical Standardization (CENELEC), Electromagnetic compatibility (EMC), Part 3. Limits, Section 3. Limitation of voltage fluctuations and flicker in low-voltage supply systems for equipment with rated current 16A, European Standard EN 61000-3-3, Jan. 1995.

Kochar, M.J. and Steigerwald, R.L., "An AC to DC converter with high quality input waveforms," Proceedings of IEEE Power Electronics Specialists Conference, pp. 63-75, 1982, no month.

Andreycak, Bill, Power Factor Correction Using The UC3852 Controlled On-Time Zero Current Switching Technique, Application Note U-132, Unitrode Corporation, Merrimack, New Hampshire, 1991, pp. 3-235- 3-250, no month.

Andreycak, Bill, "Controlled ON-Time, Zero Current Switched Power Factor Correction Technique," Texas Instruments, 2001, pp. 3-1-3-11, no month.

International Standard, Electromagnetic Compatibility (EMC)—Part 3: Limits—Section 2: Limits for harmonic current emissions (equipment input current ≦ A per phase), CEI/IEC 1000-3-2; 1995, p. 7; 31; 39, no month.

\* cited by examiner

Crest Factor of the waveform = $\dfrac{I_p}{I_{rms}}$

Power Factor and Output Voltage
Control with Over Current Protection

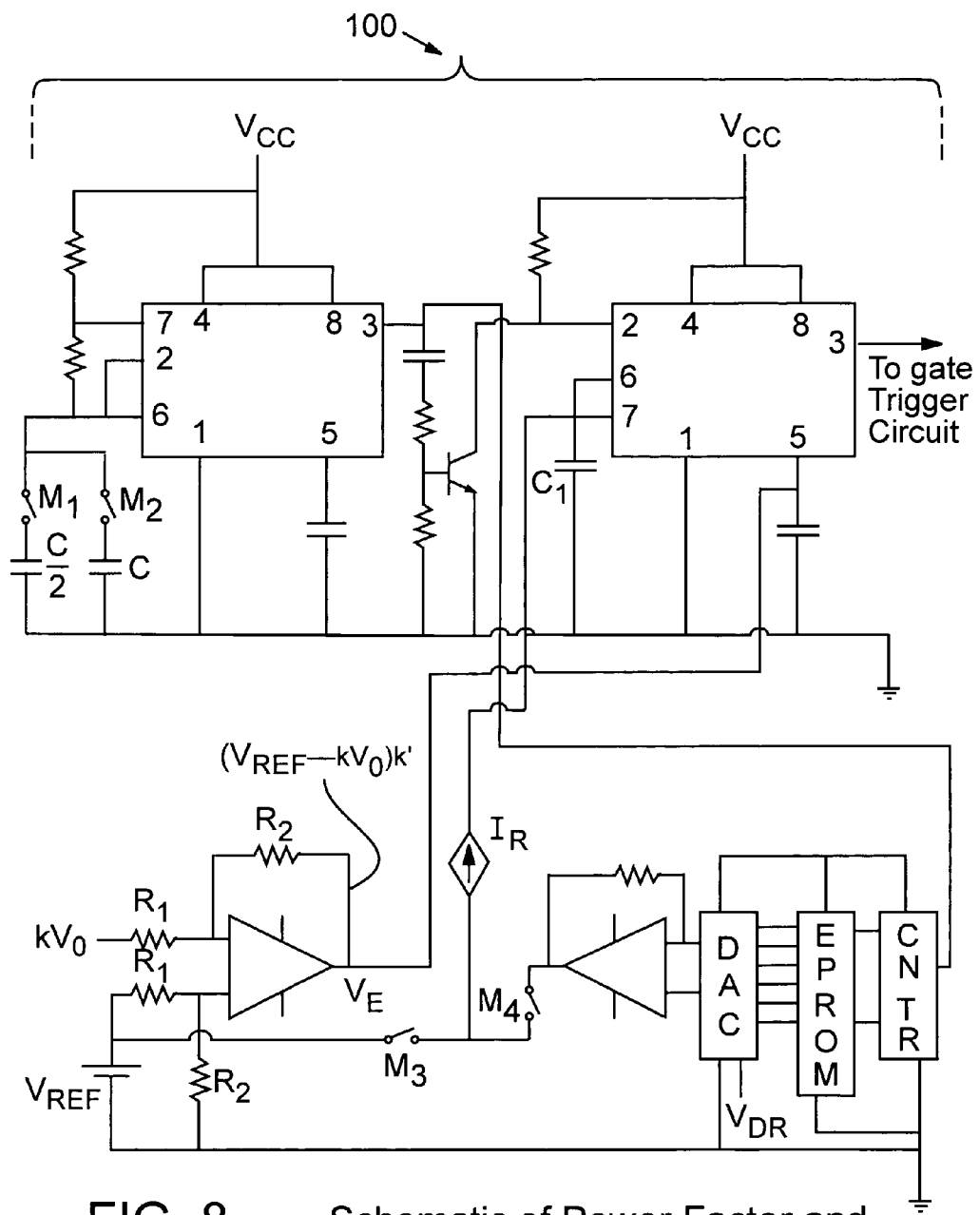
FIG. 8  Schematic of Power Factor and Output Voltage control

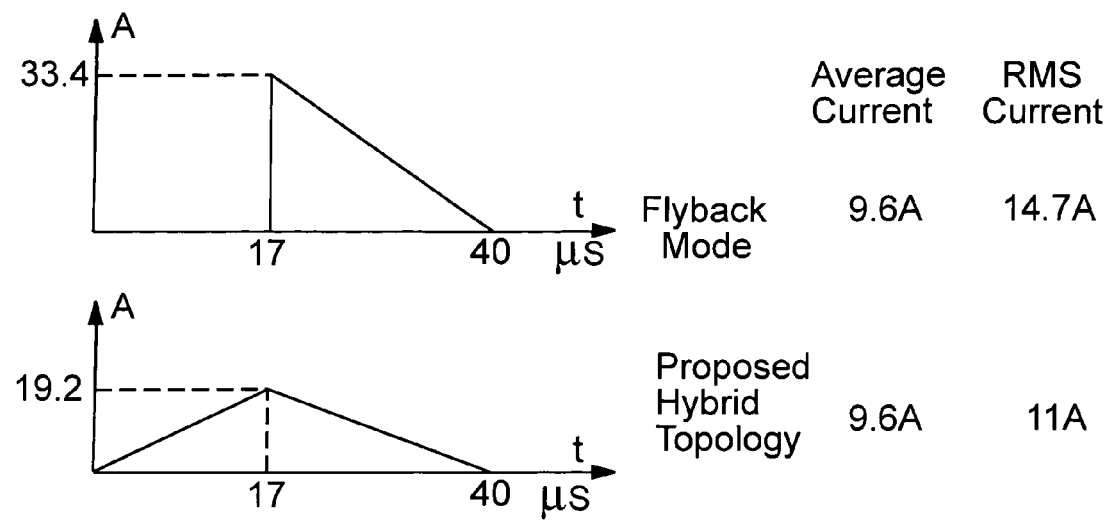
Secondary current waveforms
Hybrid technology helps significantly to reduce both peak and RMS currents
FIG. 9 The secondary current waveforms for a flyback converter and hybrid technology

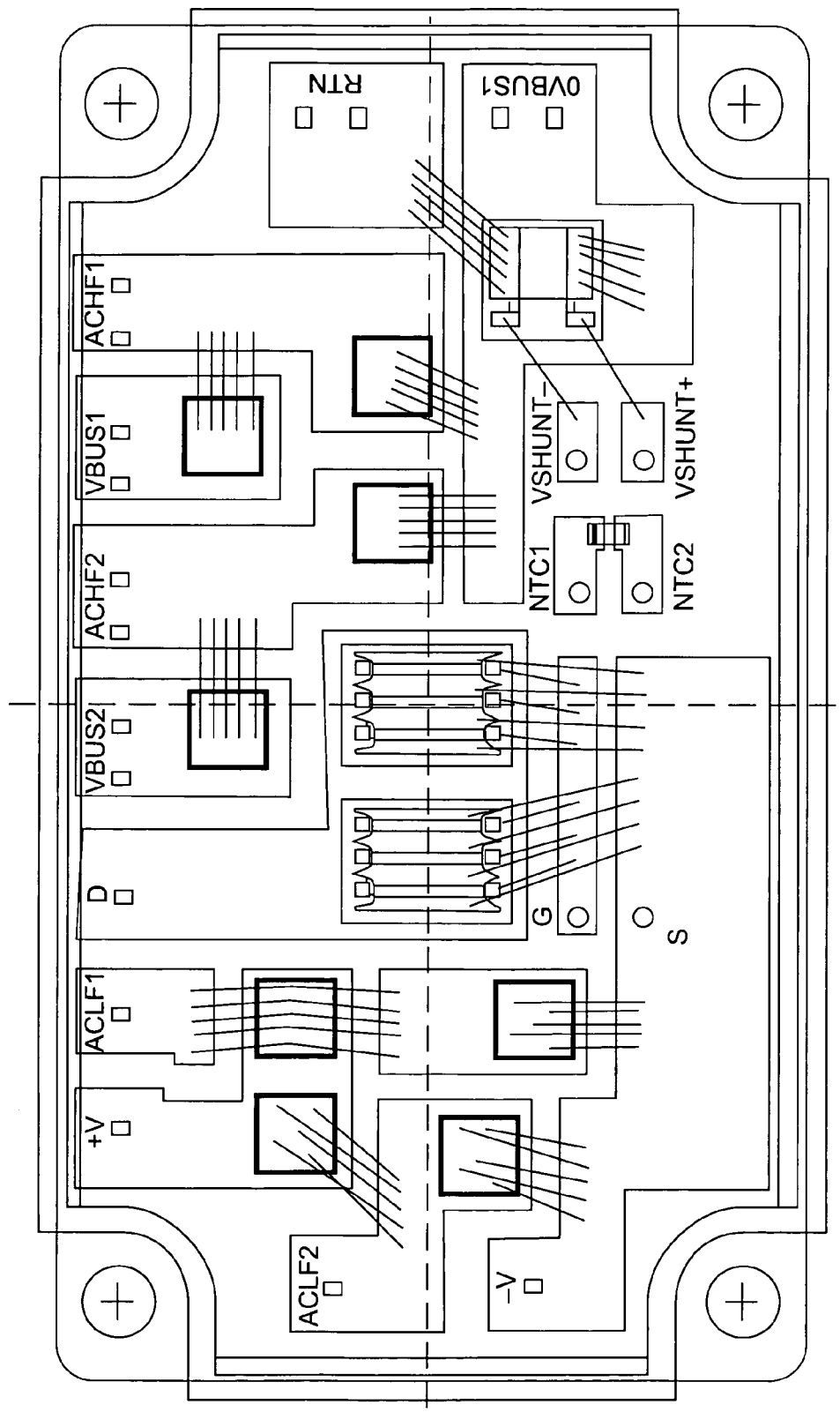
FIG. 10A POWER MODULE – LAYOUT
SMART CONVERTER MODULE – POWER STAGE

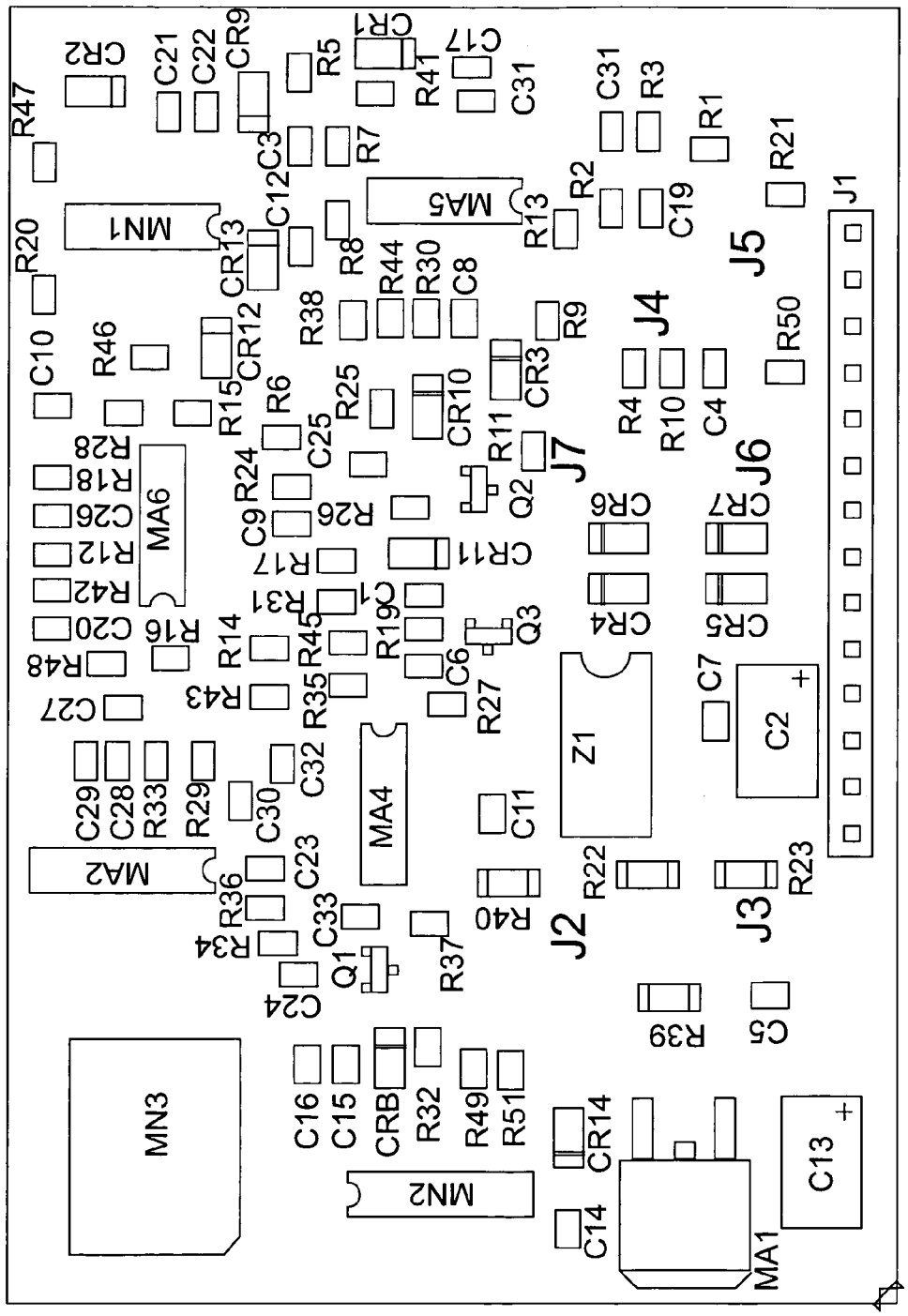
FIG. 10B  POWER MODULE – LAYOUT
SMART CONVERTER MODULE – CONTROL STAGE

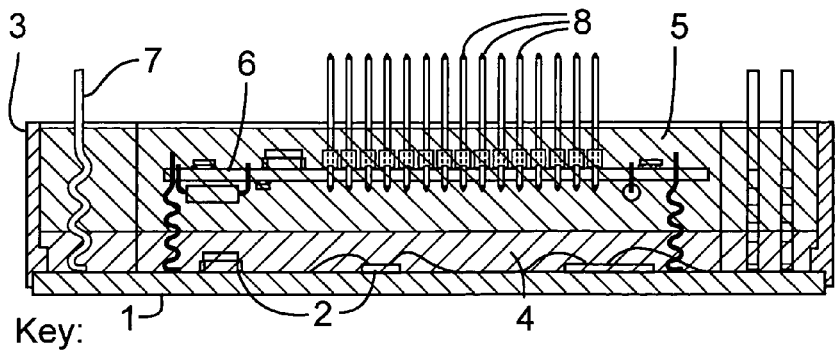

Key:
(1) Module base plate (IMS substrate)
(2) Silicon chips and other power components, soldered to the substrate: upper connections to chips via ultrasonically bonded aluminum wires.
(3) Moulded outer wall
(4) Silicone gel conformal coating over substrate assembly
(5) Resin top layer to fill cavity
(6) Internal PCB, with all necessary control and protection functions: hybrid SMD/chip construction.
(7) 1 x 1.5 solderable power connectors
(8) Small signal connector. These connectors are available to the user for control circuit inputs (e.g. power supply points, DC output voltage feedback signal etc. )

FIG. 12 Cross Section of Module

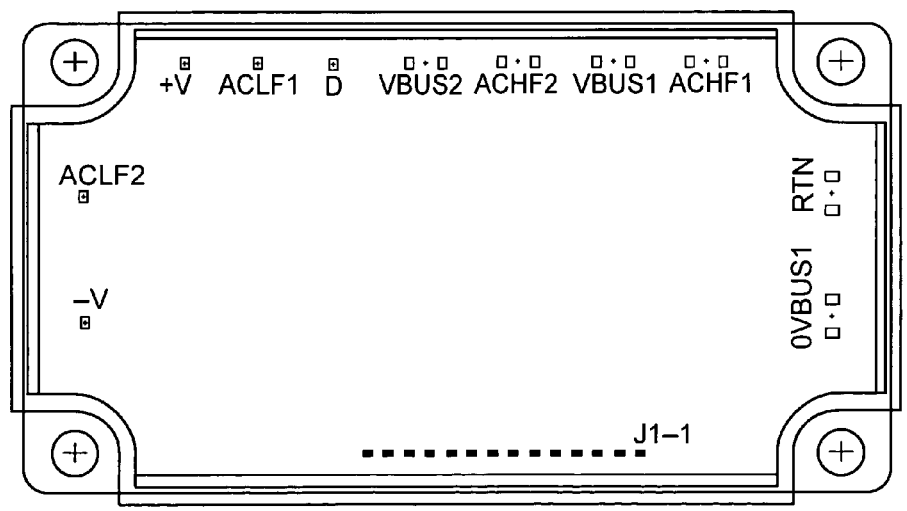

FIG. 13

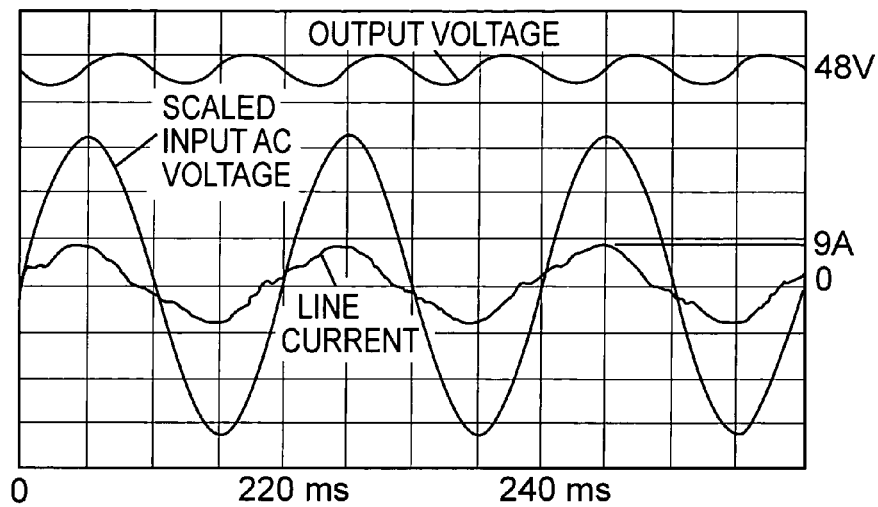
FIG. 16
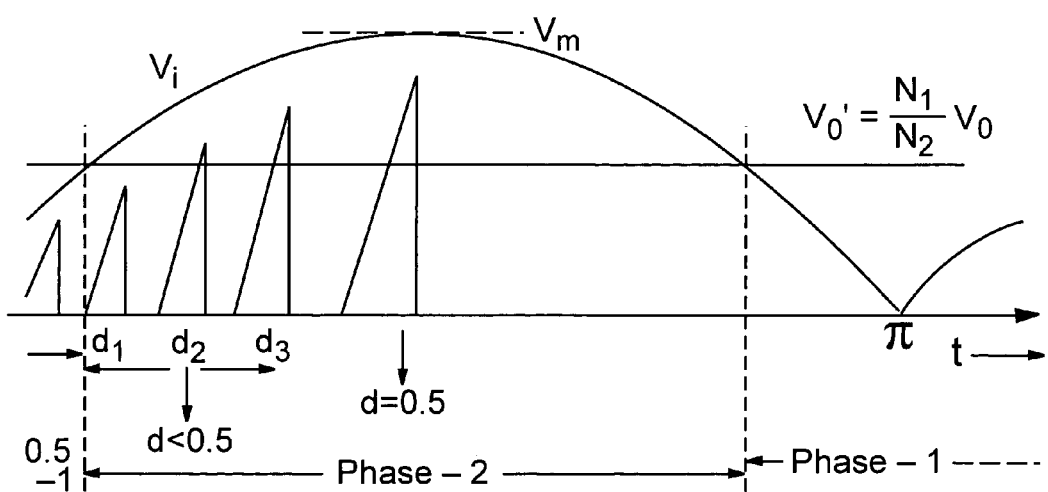
FIG. 17 Primary Side Current Waveforms
Corresponding to the Maximum Load Condition
$d_1 < d_2 < d_3 < \ldots$

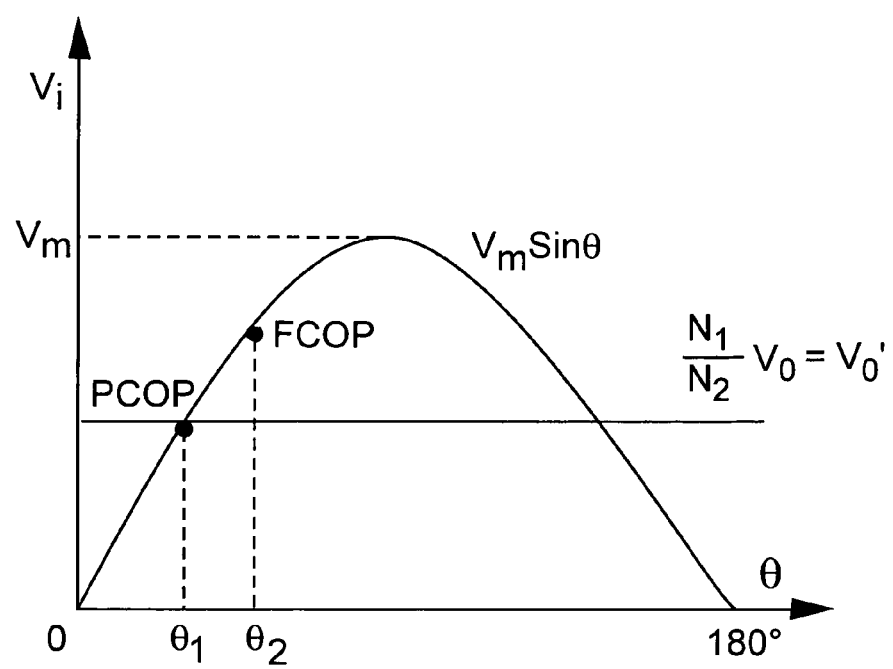
FIG. 20  Diagram showing relative positions of PCOP and FCOP

POWER CONVERTER METHOD AND APPARATUS HAVING HIGH INPUT POWER FACTOR AND LOW HARMONIC DISTORTION

RELATED APPLICATIONS

The present application claims priority from provisional U.S. Provisional Patent Application Ser. No. 60/420,193 entitled A SMART POWER CONVERTER MODULE FOR BUCK APPLICATIONS OPERATING AT HIGH INPUT POWER FACTOR, filed Oct. 21, 2002, the disclosure of which is incorporated herein by this reference.

BACKGROUND OF THE INVENTION

The present invention relates to power converter circuits for use in power supply, battery backup or uninterruptible power supply and other power conversion applications. More particularly, it relates to the implementation of an exemplary power module concept featuring high input power factor, simplicity of design, low-cost and good efficiency. The power module circuit having a single-stage and employing only a single-switch incorporates a hybrid of duty cycle and frequency control to achieve low total harmonic distortion (THD), low peak current stress on the transformer secondary circuit elements and low electromagnetic interference (EMI).

The conventional scheme used for AC-DC power conversion employs a diode rectifier-capacitor filter combination at the front end as shown in FIG. 1A. While this scheme is straightforward and economical, it severely deteriorates the quality of the AC supply by drawing peak currents near the peak of the input AC voltage as shown in FIG. 1B. This current is rich in harmonics (total harmonic distortion, THD, is very high) and results in poor power factor. There are several major disadvantages associated with having high harmonics injected back into the power grid such disadvantages include overheating of the distribution lines, distribution transformers and the neutral line interference with communication and control signals, over-voltages due to resonance conditions and most importantly an ineffective utilization of the voltage-ampere (V-A) rating of the utility.

With regulatory agencies more vigilant about power quality and the appropriate standards, e.g. with IEC-555-2 in place, consistent efforts have been made by engineers to develop new circuits for power factor correction (PFC) and/or THD reduction. In conjunction with the PFC circuits, new control schemes have also been proposed. Such is the popularity of some of these circuits and control schemes that manufacturers have come up with specialized integrated circuits (IC)s (e.g. MC34262, UC3854, etc.) dedicated to these circuits.

The following publications are relevant background information to the present invention although not all cited publications are prior art to the present application. Such may be referred to hereinafter by their ordinal numbers in brackets, e.g. the Kochar et al article might be referred to simply as [1].

[1] M. J. Kochar and R. L. Steigerwald, "An AC to DC converter with high quality input waveforms," Proceedings of IEEE Power Electronics Specialists Conference, pp. 63–75, 1982.

[2] M. F. Schlecht, B. A. Miwa, "Active power factor correction for switching power supplies," IEEE Transactions Power Electronics, Vol. 2, No. 4, pp. 273–281, 1987.

[3] H. Akagi, "Trends in active power line conditioners," IEEE Transactions on Power Electronics, Vol. 9, pp. 263, May 1994.

[4] R. Redl, L. Balogh and N. Sokal, "A new family of single stage isolated power factor correctors with fast regulation of the output voltage," IEEE Power Electronics Specialists Conference, pp. 1137–1144, 1994.

[5] R. Erickson, M. Madigan and S. Singer, "Design of a simple high-power-factor rectifier based on the flyback converter," IEEE Applied Power Electronics Conference and Exposition, pp. 792–801, 1990.

[6] A. R. Prasad, P. D. Ziogas and S. Manias, "A new active power factor correction method for single phase buck boost AC-DC converter," Proceedings of APEC, pp. 814–820, 1992.

[7] Eric X. Yang, Y. Jiang, G. Hua and F. C. Lee, "Isolated boost circuit for power factor correction," Proceedings of APEC, pp. 196–203, 1993.

[8] M. Kheraluwala, R. Steigerwald and R. Gurumoorthy, "A fast response high power factor converter with a single power stage," IEEE Power Electronics Specialists Conference, pp. 769–779, 1991.

[9] Matteo Daniele, Praveen K. Jain and Geza Joos, "A single-stage power-factor-corrected AC/DC converter," IEEE Transactions on Power Electronics, Vol. 14, No. 6, pp. 1046–1055, November 1999.

[10] H. Wei, Issa Batarseh, G. Zhu and P. Kornetzky, "A single-switch AC-DC converter with power factor correction," IEEE Trans. on Power Electronics, Vol. 15, No. 3, pp. 421–430, May 2000.

[11] H. E. Tecca, "Power Factor Correction using merged flyback-forward converters," IEEE Transactions on Power Electronics, Vol. 15, No. 4, pp. 585–594, July 2000.

[12] M. M. Jovanovic, D. M. C. Tsang and F. C. Lee, "Reduction of voltage stress in integrated high quality rectifier regulators by variable frequency control," Proceedings of Applied Power Electronics Conference (APEC), pp. 569–575, 1994.

[13] Serge Bontemps and Denis Grafham, "Low-loss resonant gate drive saves energy and limits EMI in 3.5 kW hard-switched PFC boost-converters," PCIM 2002 (Europe), Nuremberg, Germany.

[14] Madhuwanti Joshi and Vivek Agarwal, "EMI mitigation in power electronic circuits operating at high power factor," Proceedings of the IEEE International Conference on Industrial Technology 2000, Goa India, pp. 267–271.

[15] V. N. Shet, "Power Factor Correction in Power Converters," Ph. D. Dissertation, Dept. of Electrical Engineering, IIT-Bombay, 2002.

[16] R. P. Stratford, "Rectifier harmonics in power systems," IEEE Trans. Ind. Appl. Vol. IA-16, pp. 271–276, 1980.

[17] W. Shepherd, P. Zand, "Energy flow and power factor in nonsinusoidal circuits," (London: Cambridge University Press), 1979.

[18] International Electrotechnical Commission Sub-Committee 77A, "Disturbances in supply system caused by household appliances and similar electrical equipment," Draft Revision of IEC Publication 555.2, 1992.

[19] F. C. Schwarz, "A time-domain analysis of the power factor for a rectifier filter system with over and subcritical inductance," IEEE Trans. Ind. Electron. Control Instrum., IECI-20(2), pp. 61–68, 1973.

[20] Vorpe'rian, R. Ridley, "A simple scheme for unity power-factor rectification for high frequency AC buses," IEEE Trans. Power Electron 5, pp. 77–87, 1990.

[21] P. Jain, "A unity power factor resonant AC/DC converter for high frequency space power distribution system," IEEE Power Electron. Spec. Conf., Rec. 1, 1994.

[22] A. R. Prasad, P. D. Ziogas, S. Manias, "A novel passive waveshaping method for single phase diode rectifiers," IEEE Trans. Ind. Electron., IE-37, pp. 521–530, 1990.

[23] K. Yamashita, "Harmonics fighters pursue choke-coil, on converter power supplies", Nikkei Electron., Asia, pp. 44–47, August 1994.

[24] Jih-Sheng Lai, D. Hurst, T. Key, "Switch mode power supply power factor improvement via harmonic elimination methods," IEEE Appl. Power Electron. Conf., Rec., pp. 415–422, 1991.

[25] A. R. Prasad, P. D. Ziogas, S. Manias, "A Comparative evaluation of SMR converters with and without active input waveshaping," IEEE Trans. Ind. Electron. IE-35(3), pp. 461–468, August, 1988.

[26] N. Mohan, T. M. Undeland, R. J. Ferraro, "Sinusoidal line current rectification with a 100 kHz BN-SIT step up converter," IEEE Power Electron. Spec. Conf., Rec., pp. 92–98, 1984.

[27] B. Andreyeak, C. H. Yeam, J. A. O. Connor, "UC3852 controlled on-time zero current switched power factor correction preregulator," Design Guide (Preliminary), Application note U-132, Unitrode Power Supply Design Seminar Manual, SEM 800, 1991.

[28] P. N. Enjeti, R. Martinez, "A high performance single phase AC to DC rectifier with input power factor correction," IEEE Appl. Power Electron. Conf., Rec., pp. 196–203, 1993.

[29] M. S. Dawande, G. K. Dubey, "Bang bang current control with predecided switching frequency for switch mode rectifiers," IEEE Power Electron Drives Syst. Conf., Rec., pp. 538–542, 1995.

[30] C. Zhou, R. B. Ridley, F. C. Lee, "Design and analysis of hysteretic boost power factor correction circuit," IEEE Power Electron. Spec. Conf., Rec., pp. 800–807, 1990.

[31] J. J. Spangler, A. K. Behera, "A comparison between hysteretic and fixed frequency boost converters used for power factor correction," IEEE Appl. Power Electron. Conf., Rec., pp. 281–286, 1993.

[32] W. Tang, F. C. Lee, R. B. Ridley, I. Cohen, "Charge control: Modelling, analysis and design," IEEE Power Electron. Spec. Conf., Rec., pp. 503–511, 1992.

[33] W. Tang, Y. M. Jiang, G. C. Hua, F. C. Lee, I. Cohen, "Power factor correction with flyback converter employing charge control," IEEE Appl. Power Electron. Conf., Rec., pp. 293–298, 1993.

[34] H. Endo, T. Yamashita, T. Sugiura, "A high power factor buck converter," IEEE Power Electron. Spec. Conf., Rec., pp. 1071–1076, 1992.

[35] D. Maksimovic, R. Erickson, "Universal-input, high-power-factor, boost doubler rectifiers," IEEE Appl. Power Electron, Conf., Rec., pp. 459–465, 1995.

[36] Bakari M. M. Mwinyiwiwa, P. M. Birks, Boon-Teck Ooi, "Delta-modulated buck-type PWM converter," IEEE Trans. Ind. Appl. 28, pp. 552–557, 1992.

[37] Boon-Teck Ooi, Bakari M. M. Mwinyiwiwa, X. Wang, G. Joos, "Operating limits of the current-regulated delta-modulated current-source PWM rectifier," IEEE Trans. Ind. Appl., 38, pp. 268–274, 1991.

[38] P. C. Todd UC 3854, "Controlled power factor correction circuit design," Unitrode-Product Applications Handbook, Lexington, Mass., 1993–94.

[39] Micro Linear Data Book, 1993

[40] R. Oruganti and M. Palaniapan, "Inductor voltage controlled variable power factor buck—type AC-DC converter," Proceedings of Power Electronics Specialists Conference (PESC), pp. 230–237, 1996.

[41] R. Oruganti and Ramesh Srinivasan, "Single phase power factor correction—A review," Sadhana, vol. 22, part 6, pp. 753–780, 1997.

[42] F. C. Schwarz, "A time-domain analysis of the power factor for a rectifier filter system with over and sub-critical inductance," IEEE Tran. on Ind. Electron. Control Instrumentation, IECI-20(2), pp. 61–68, 1973.

[43] A. R. Prasad, P. D. Ziogas, S. Manias, "A novel passive waveshaping method for single phase diode rectifiers," IEEE Tran. Ind. Electron., IE-37, pp. 521–530, 1990.

[44] I. Takahashi, R. Y. Igarashi, "A switching power supply of 99% power factor by the dither rectifier," IEEE International Telecommunication Energy Conference Record, pp. 714–719, 1991.

[45] M. Madigan, R. Ericson, E. Ismail, "Integrated high quality rectifier regulators," IEEE Power Electronic. Spec. Conference, pp. 1043–1051, 1992.

[46] M. S. Elmore, W. A. Peterson, S. D. Sherwood, "A power factor enhancement circuit," IEEE Applied Power Electron. Conf. Record, pp. 407–414, 1991.

[47] Vivek Agarwal, V. P. Sundarsingh, Serge Bontemps and Denis Grafham, "A Smart Power Converter Module for Buck Applications Operating at High Input Power Factor," Proceedings of the $28^{th}$ Annual Conference on Industrial Electronics, Control and Instrumentation (IECON), Sevilla, Spain, pp. 858–863, 2002.

[48] Vivek Agarwal, V. P. Sundarsingh, Serge Bontemps, Alain Calmels and Denis Grafham, "Novel single-switch isolated 42V/1 kW battery charger module uses converter operating at near-unity Power Factor," Proceedings of PCIM-2003, Nuremberg, Germany, May 20–22, 2003.

[49] Yufu Wang, "Boost converter with lower inter-phase rectifier parallel compensating three-phase power factor correction," Chinese Patent Application No. 01140014.5, Nov. 20, 2001.

[50] L. Umanand and S. R. Bhat, "Design of magnetic components for switched mode power converters", First Edition, Willey Eastern Limited, 1992.

[51] Y. F. Zhang, L. Yang and C. Q. Lee, "EMI reduction of power supplies by Bi-Frequency modulation," Proceedings of the Ninth Annual Applied Power Electronics Conference and Exposition, pp. 601–607, 1994

The advantages of a high power factor and low harmonic distortion are well known. A major advantage is an optimum utilization of power coming out of the utility [1, 16–18]. The past two decades have witnessed a tremendous research effort related to power factor correction in switching power supplies [1–49]. This could be attributed to the growing awareness about power quality and the seriousness with which the concerned agencies all over the world have started enforcing power quality standards.

For purposes of highlighting the novelty of the present invention, prior art schemes will be reviewed first.

PRIOR ART SCHEMES

The major issues [2–4] concerning power factor correction circuits are the size and the cost of the system, complexity of the circuit topology (e.g. single stage, dual stage, etc.) and its control (e.g. duty cycle control or variable frequency control or a combination of the two), output voltage regulation and its ripple content and the efficiency of the converter (single stage or multiple stage). In earlier days, the trend was to use a boost topology and to modulate its duty cycle, so as to present a resistive load to the line voltage. But any such scheme needs a second stage for isolation and load voltage control. A simple scheme based on a flyback converter operating in a discontinuous current mode (DCM) with constant duty cycle is reported by Erickson et al [5], with isolation incorporated in the first stage. A new power factor correction scheme for a single-phase buck-boost converter is proposed by Prasad et al [6]. Some of the single stage configurations proposed are the isolated boost topology proposed by Yang et al [7], a fast-response topology utilizing the inherent characteristics of resonant boost stage by Kheraluwala et al [8] and the dual switch forward topology proposed by Daniele et al [9]. But these approaches all utilize at least two switches.

Redl et al [4] proposed a new family of power factor corrector circuits ($S^2IP^2$), which overcame most of the drawbacks of then-existing configurations. Merged configurations of derived boost and buck configurations have also been used for power factor correction (PFC) [10,11]. Other authors reported on related aspects including reduction of high-voltage stress on primary side devices [12] and electromagnetic interference (EMI) in PFC circuits [13,14].

After this initial overview, the underlying ideas and classification of the various PFC techniques are presented next. More literature review is taken up subsequently.

PFC Technique Attributes:

A good PFC technique should provide the following features:

(a) Harmonic free (sinusoidal) input line current with near unity power factor over a wide load variation (b) Good line and load regulation—with fast output dynamics (c) Small size, low weight, low part count, economical (d) High power conversion efficiency (e) Low EMI In addition to the above, the following may also be desirable depending on the specific application:

(a) Galvanic isolation between input and output.

(b) Universal input AC voltage range (typically 85V to 270V root mean squared (RMS).)

(c) Low output ripple (d) Wide range of output voltage, from very low DC output (e.g. 12V, 24V, etc.) to high voltage (e.g. 800V)

(e) Good hold-up time if required by the application (Hold-up time is a measure of how long a supply will hold output voltages to within specifications after input power has been lost. For example, a supply with sufficient hold-up time can keep providing power to the load during short power outages.)

Classification of PFC Techniques [41]:

The PFC techniques may be classified into the following categories:

(a) Passive PFC (PPFC)

(b) Active PFC (APFC)

(c) Combination of categories (a) and (b) (PPFC+APFC)

Passive Power Factor Correction (PPFC)

PPFC's make use of inductive filters and resonant filters (combination of L and C) [42, 43]. An exemplary PPFC circuit is shown in FIG. 2. These techniques do not make use of any additional active devices/circuitry for power factor improvement. Hence, these solutions are simple, reliable and cost-effective at low power levels. But they suffer from the following disadvantages:

(a) These techniques attempt to bring down the harmonic levels to within the limits set by the standards. They do not attempt to improve it beyond what is required by the standards. Thus they still do not facilitate an effective V-A utilization.

(b) PPFC does not allow wide input AC voltage variation (e.g. from 85V to 270V). Because PPFC uses only passive components therefore cannot maintain output regulation when the input fluctuates over a wide range.

To accommodate a wide range of voltage variation one must use active switches and duty cycle control. For a duty cycle controlled system, for example, a duty cycle ratio range of 0.1 to 1.0 is normal. To allow a wider variation, this range could be widened to 0.01 to 1. However, this will require very high $t_r$ and $t_f$ times of the switching devices.

(c) At higher power levels the reactive elements of a PPFC tend to be large and bulky and are no longer cost effective.

(d) At higher power levels, the power factor does not remain within the specified limits over a wide variation of power levels.

Active Power Factor Correction (APFC)

In contrast to the PPFC techniques, the APFC techniques [6, 26–37, 40] make use of additional devices/control circuitry to improve the power factor and harmonic profile. Therefore, these are expensive techniques as compared to PPFCs. Nevertheless, their overall performance is far superior. The conventional APFCs are, in general, single-stage configurations based on buck, boost, flyback (see FIG. 3), forward or modified topology, employing one or more switches. The boost and flyback topologies are operated in continuous current mode (CCM) or discontinuous current mode DCM [7, 27, 33]. It should be noted that:

(a) Flyback configuration—Control chips are available to implement this kind of configuration. The major disadvantage is high peak currents.

(b) Forward mode—with CCM, the transformer has to operate at the principal frequency (50 Hz, 60 Hz, 400 Hz or other commonly used AC frequencies), thereby increasing the size of the transformer. Thus, DCM operation commends itself by permitting the use of smaller transformers. But it has the disadvantage of higher peak currents.

In APFCs, the input line current is controlled by various techniques such as peak current mode control, average current mode control [12, 26], charge control [17, 18, 32, 33], hysteresis current mode control [15, 16, 30, 31], sinusoidal pulse width modulation (PWM) [14, 28], delta modulation control [21, 22, 36, 37], inductor voltage control [23, 40], etc. In fact, many of these control schemes are available as ICs.

APFC could be both current source type (usually buck type) [36, 37] or voltage source type [1, 2, 26]. The voltage source type, which is more popular, may use buck, boost, buck-boost, cuk or derived topology. The following points must be noted regarding these configurations:

(a) A boost configuration, operating in CCM, is suitable for medium to high power level applications because the boost inductor results in low input supply ripple and hence the filter requirements are reduced. But this configuration suffers from the demerits of high reverse recovery loss, charge pumping loss, poor EMI performance and to some extent even cusp distortion near the zero crossings of the input current. Some of these problems may be alleviated using soft-switching techniques and resonant power conversion techniques.

(b) The problem of reverse recovery of output diode may be eliminated by operating the boost configuration at the CCM-DCM boundary.

(c) A boost converter operating in DCM does not give a sinusoidal input current unless the duty cycle of the switching device is varied continuously. Also, the peak current stresses on the devices are greater.

(d) The use of flyback (buck-boost) topology can be attractive at lower power levels. It offers several advantages. For example, the start-up in-rush current problem is not present, overload protection may be easily implemented, the output voltage may be greater or less than the peak input voltage and galvanic isolation is possible. Both CCM and DCM modes of operation are possible, but result in more noise. The diode reverse recovery problem is eliminated when operating this topology in the DCM mode.

The existing APFC schemes suffer from one or more of the following disadvantages:

(a) Suffer from all the drawbacks of DCM operation.

(b) In many cases, the voltage across the bulk energy storage capacitor is uncontrolled and can reach high values. A higher rated capacitor will result in increased cost and greater power loss due to larger ESR values.

(c) The frequency varies in many cases over a wide range (typically 8 times), making the EMI filter design difficult.

(d) Increased stress on devices.

(e) Efficiency of power conversion is generally low.

(f) Complex control.

(g) Large filter capacitor to filter second harmonic components.

(h) Slow output dynamics.

Some of the drawbacks mentioned above (e.g. slow output dynamics, complex control may be overcome by using modified configurations such as a cascaded configuration [1] comprising two stages with independent control. The first stage corrects the power factor while the second stage provides tight regulation of output voltage against fast, dynamic load. The disadvantage with this scheme is lower efficiency because of two stages. This disadvantage is overcome to some extent by merging the two stages of a cascade configuration into one power stage [44, 45]. This increases the efficiency but the control becomes complex. Many power factor corrected circuits belong to this category.

PPFC+APFC:

A combination of APFC and PPFC can result in improved efficiency and reduced size and cost [41, 46]. An example of this scheme is where the active power factor correction circuit operates only during some portion of the input AC waveform, while in the remaining portion, a passive network (PPFC), connected in parallel with the APFC circuit, takes over.

SUMMARY OF THE INVENTION

The present invention employs a single-stage, single-switch, input-output isolated converter configuration using a hybrid combination of forward and flyback converter topology. It uses a novel control scheme based on duty cycle control in conjunction with two discrete operating frequencies. A continuously varying operating frequency is not required, reducing the complexity of the control circuit. It results in reduced peak current stress on the circuit components leading to higher circuit reliability. Since the converter operation switches between two operating frequencies, its noise spectrum spreads out [51] making it more electromagnetic compatible (EMC). The cost is substantially lower than prior art multiple-stage and multiple-switch APFC designs and operates with high power factor and a well-regulated DC output voltage. This power factor correction circuit apparatus and method is especially suited for 'buck' applications where low DC output voltages (e.g. 24V, 48V) are needed. One particular embodiment of the invention is in the form of a fully self-contained power converter module. The proposed configuration can be further integrated to reduce system size and will be of especial interest to industries associated with battery charging and uninterruptible power supply (UPS) systems.

DESCRIPTION OF THE DRAWINGS

FIG. 8 is a detailed schematic diagram implementing the novel control strategy corresponding to FIG. 7.

FIG. 9 is a waveform diagram contrasting the input current versus time of a conventional flyback converter (upper trace) and the present invention using the novel control strategy (bottom trace).

FIG. 10 is a top plane view of (a) the power substrate illustrating major component layout on the power stage and (b) the PCB control stage layout in accordance with one embodiment of the power module invention of the power substrate.

FIG. 12 is a cross-sectional side elevation view of the invented power module depicted in FIG. 10.

FIG. 13 is the pin out schematic for the invented power module depicted in FIG. 10.

FIG. 16 is a PSPICE simulation graph showing simulated line current, scaled input AC voltage and output voltage in accordance with the above described power converter design, for comparison with the experimental results illustrated in FIGS. 14 and 15.

FIG. 17 is a diag1ram of primary side current waveforms corresponding to the maximum load condition for $d_1 < d_2 < d_3 < \ldots$.

FIG. 20 is a diagram showing relative positions of PCOP and FCOP in the rising portion of an AC cycle.

DETAILED DESCRIPTION OF THE INVENTION

The Problems To Be Solved by the Invention:

As is clear from the brief review presented in the preceding sections, the existing schemes suffer from one or more of the following drawbacks:

(a) The size, weight and volume of the system is great.

(b) The cost of the system is high.

(c) The circuit topology (e.g. single stage, two stage etc.) is complex.

(d) The control strategy is complex.

(e) Output voltage regulation within the specified range is not possible.

Further, buck applications requiring 12V, 24V and 48V supplies are generally not possible.

(f) The output ripple content is high.

(g) The peak current stress is great on the devices and the transformer.

(h) The efficiency of the converter is low.

Objectives:

Both Single Stage and Multiple stage converters (employing one or more switches) have been extensively used as power factor correction stages in all sorts of systems. The present invention is based on the following objectives:

(a) To provide a single-stage, single-switch power factor corrected circuit (power stage) to meet low DC voltage (12V, 24V, 48V etc.) application requirements in the industry.

(b) To provide a new control strategy that is simple to implement but has all of the desirable features.

(c) To integrate (a) and (b) into a compact module to enhance reliability and compactness for industrial applications.

Figure 1A:
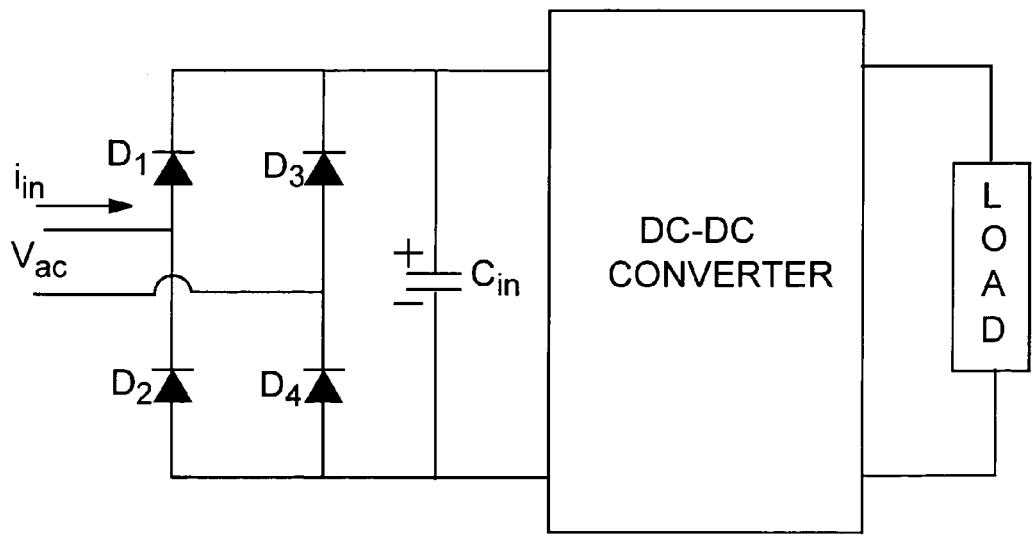
FIGS. 1A and 1B respectively illustrate a circuit topology and corresponding voltage and current waveforms representing a conventional AC-DC power conversion scheme.
Figure 1B:
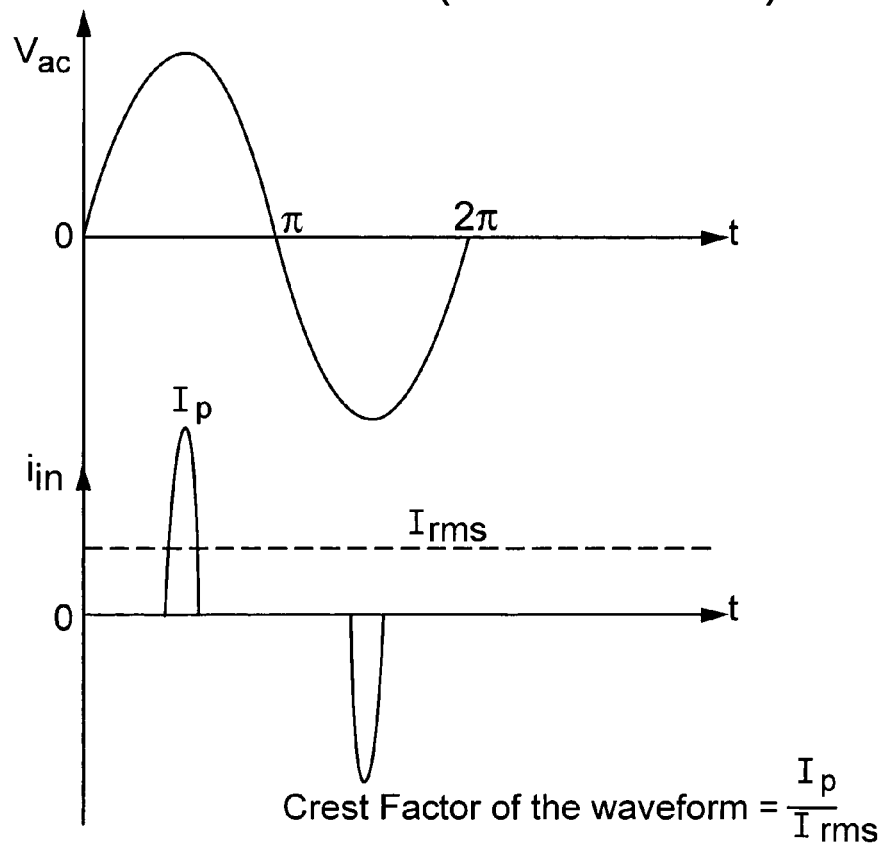
Figure 2:
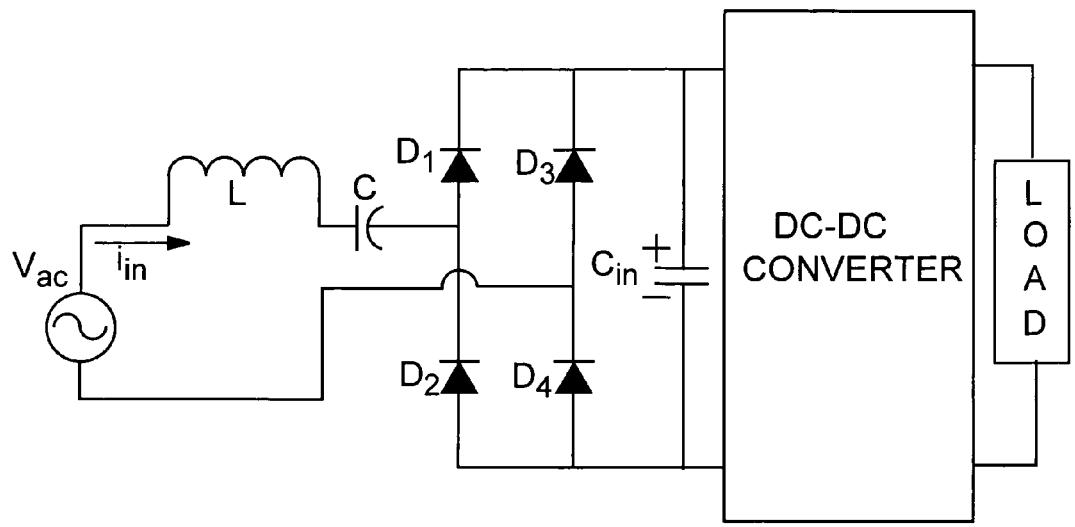
FIG. 2 is a circuit diagram illustrating a conventional passive power factor correction (PPFC) scheme. L and C are the filter elements for THD reduction.
Figure 3:
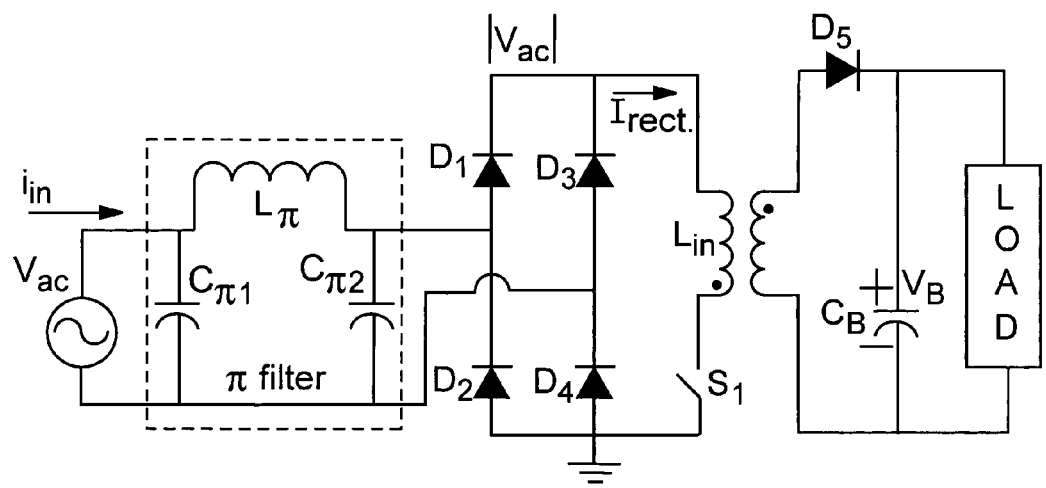
FIG. 3 is a circuit diagram illustrating a conventional active power factor correction (APFC) scheme.
Figure 4:
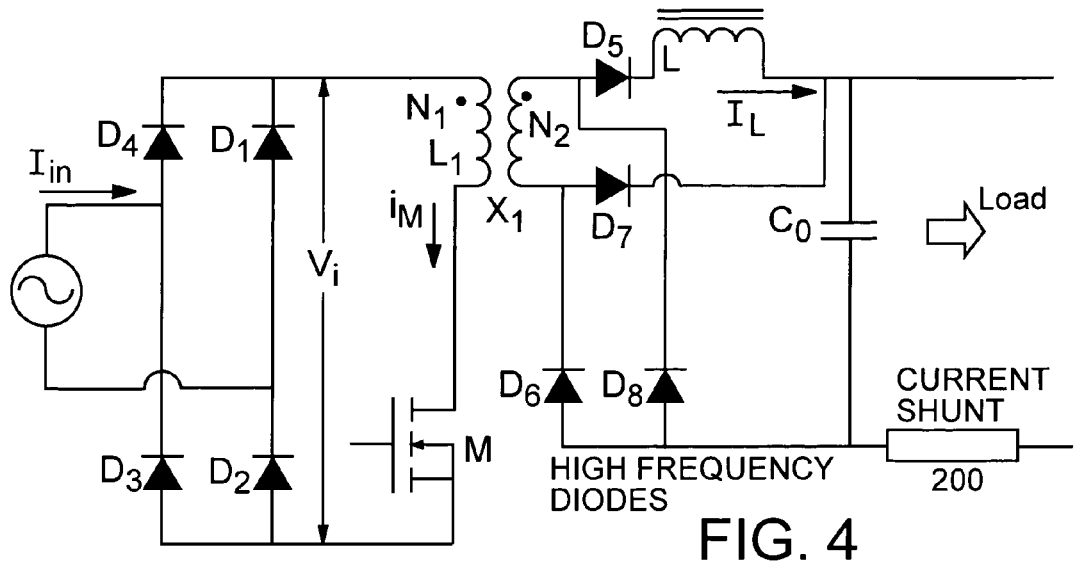
FIG. 4 is a circuit diagram illustrating the basic hybrid topology wherein the proposed control scheme has been implemented and is found to give excellent results. The output rectifier diodes are connected in a special, novel configuration.

These three objectives will be discussed further below:

The Power Stage:

FIG. 4 shows the single-switch, single-stage hybrid topology used as the power stage [47]. This configuration is proposed to reduce the size of the transformer, as a major advantage. When this circuit is operated in conjunction with the proposed control scheme, peak currents are substantially reduced. It should be noted that the output rectifier diodes in FIG. 4 are connected in a special, novel configuration. It is novel because the secondary rectifiers are not connected in the manner of a traditional bridge rectifier. It is connected to facilitate the combination of flyback and forward mode of operation.

Figure 5:
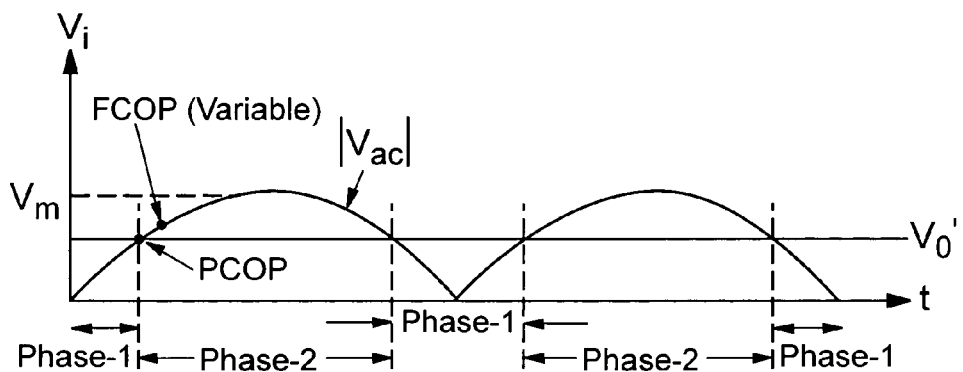
FIG. 5 is a waveform diagram illustrating the novel control strategy embodied in the circuit topology of FIG. 4 showing control phases "1" and "2". "PCOP" denotes the phase change over point while "FCOP" denotes the frequency change over point which is suitably varied to achieve a good power factor. For illustration, these points are marked on one of four change over points within an AC cycle.

Proposed Control Strategy:

According to the proposed control strategy depicted in FIG. 5, when the rectified input voltage, $V_i$, is less than the reflected output voltage $V_o'$ (as in Phase 1), the device is made to operate at 50% duty cycle at full load and at a fixed frequency $f_1$. Phase 2 corresponds to the region where the rectified input voltage $V_i$ is higher than $V_o'$. The point where phase 1 changes to phase 2, is called the phase change over point (PCOP). During phase 2, the duty cycle is continuously modulated in a sine-weighted manner. At some suitable point beyond PCOP, the switching frequency is changed from $f_1$ to $f_2$. This point is called the frequency change over point (FCOP) as shown in FIGS. 5 and 20. FCOP is suitably adjusted (and hence considered a 'variable') to achieve good power factor. It should be noted that only two discrete values of operating frequency are used. A continuous frequency control (which is more complex) is not used here. The output voltage regulation is achieved by using a PWM technique.

Figure 6:
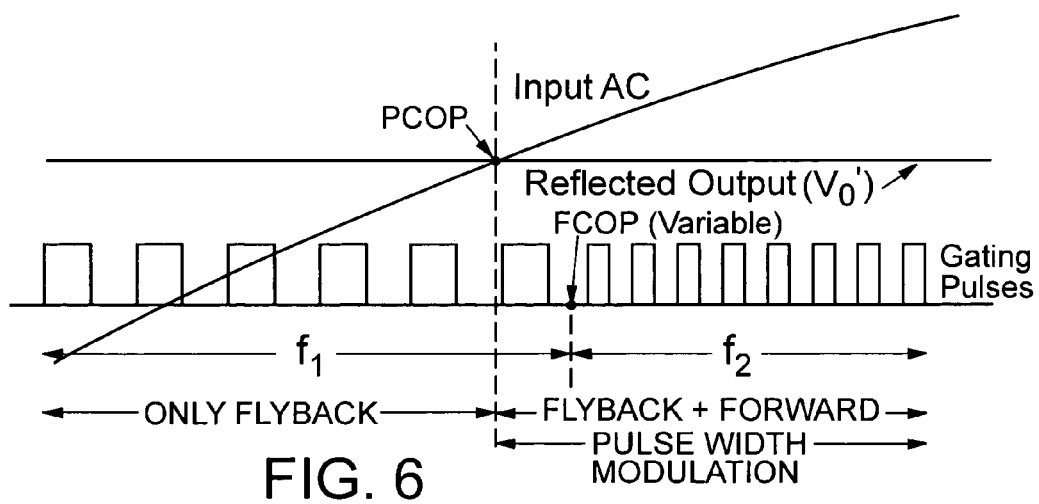
FIG. 6 is a waveform diagram showing the input AC voltage and control pulses to the switch M near the crossover points, in accordance with the novel control strategy of FIG. 5.

FIG. 6 shows typical gating waveforms to implement this control scheme.

Phase 1: When $V_i < V_o'$ (Reflected Output Voltage)

(a) Operates in flyback mode only with a constant duty cycle corresponding to a given load condition at a first fixed frequency. As the load increases, the duty cycle increases and vice versa, to maintain the output voltage constant. A 50% maximum duty cycle is contemplated to ensure that magnetic core flux resets.

(b) Since $V_i$ during the period is low, peak currents are not of a major concern since low power corresponding to the sine current is transferred.

Phase 2: When $V_i > V_o'$ (a) Operates in both flyback mode and voltage (or forward conversion) mode since diode $D_5$ (see FIG. 4) conducts when switch M is ON.

(b) Here, during the peak of the input sine voltage, the power transferred to the output is divided into two equal parts, one part by flyback and the other, by forward converter.

(c) In order to achieve this, the ON duration of the switch M is reduced (otherwise all the power will come from flyback mode) by doubling the frequency, hence, reducing the peak current. The instant at which the frequency is doubled (FCOP) is selected to achieve good power factor.

Integration into a Compact Intelligent Module:

The power stage and the control stage have been integrated into a single compact, module. This results in higher reliability. The built-in intelligence (control aspects) results in a versatile, "smart" power module increasing the scope of its applications manifold. The details of the design and fabrication of this module are presented in later sections.

To summarize, the present invention provides a novel scheme based on duty cycle control in conjunction with two discrete switching frequencies. The scheme is depicted in FIGS. 5 to 8. It should be noted that a continuous, variable frequency control is not employed here—rather, the system is made to operate with two different switching frequencies. This control scheme is an improvement over an earlier work [15], which used a single, constant frequency and two fixed duty cycles, depending on the comparison of the rectified input voltage and the reflected output voltage. The proposed invention results in a drastic reduction of input harmonics and peak current stresses on the devices and is specifically suited for 'buck' applications, e.g. applications featuring low DC output voltage (e.g. 24V, 48V). For example, this configuration will be of interest to industries associated with battery charging and UPS design and fabrication work.

An added advantage of this scheme is the reduction of EMI of the system due to bi-frequency modulation [51]. Since the converter operation switches back and forth between two operating frequencies ($f_1$ and $f_2$), the frequency spectrum will spread out showing more frequency components, but with smaller amplitudes. In comparison, if the converter is operated only at one fixed operating frequency, its spectrum will be narrow but the amplitudes will be higher, increasing the EMI magnitude and reducing the systems electromagnetic compatibility (EMC).

In view of the anticipated wide application of the proposed configuration, attempts have been made to realize a smart module which integrates the power stage with the control stage. This makes the system compact and enhances the reliability and efficiency of the system as compared to the corresponding discrete system.

Analytical Concepts Relevant to the Proposed Invention

The Smart Converter System is implemented using the configuration shown in FIG. 4 and works as follows: The input sine wave $V_{ac}$ is rectified using diodes $D_1$–$D_4$. Hence $V_i$, is a full wave rectified sine waveform. M is a power semiconductor (MOSFET in this case, a fast IGBT may also be used) switch and $X_1$ is a ferrite step-down transformer. It should be obvious to those skilled in the art that the functions provided by diodes $D_5$–$D_8$ can suitably be accomplished through the use of lower loss Schottky barrier diodes or synchronous rectifiers (such as low loss MOSFETs). To achieve the required output voltage, the transformer can be excited in three different modes.

Voltage or Forward Mode

Here $X_1$ is used as a pure transformer having a large magnetizing inductance. Considering one switching cycle and assuming that the magnetizing flux is zero at the beginning of the cycle (t=$t_1$), when switch M is turned ON, $V_m$ sin $\omega t_1$ is applied to the primary of the transformer. Hence, the secondary voltage, $V_s$ is given by:

$$V_s = \left(\frac{N_2}{N_1}\right) V_m \sin\omega\, t_1 \tag{1}$$

Those of skill in the art will appreciate that $D_5$ and $D_6$ conduct current to charge the capacitor $C_o$ through inductor L. When switch M is off, diodes $D_7$ and $D_8$ conduct current to release the magnetizing energy into capacitor $C_o$. Since, at the end of this cycle, the magnetizing flux must reach zero, the maximum duty cycle can only be 50%, where $t_1$ corresponds to the time at which the reflected voltage just equals the input voltage. If the magnetic flux does not reach zero in these designs, the size of the core and hence of the transformer will need to be increased to accommodate the energy transfer. Further, if uniform duty cycle is maintained throughout the cycle, then $I_{in}$ will be sine-weighted. Hence, the switch has to handle a maximum current of four times the peak input sine current in the case of a discontinuous mode for $I_L$. Similarly, diodes $D_5$ and $D_6$ must handle four times the peak current of $I_{in}$. It is preferable to operate the system in a discontinuous mode for realizing zero current turn-ON for switch M and to reduce the size of inductor L.

Fly-Back Mode or Current Mode

In this mode diodes $D_5$, $D_6$ and inductor L are not necessary and diode $D_8$ is forward biased. Further, transformer $X_1$ has a finite inductance in the $N_1$ winding so that the required energy can be transferred to the load. Under these conditions, when the switch is ON, primary current $I_M$ ramps up from zero current (zero-magnetizing flux), at the beginning of the cycle. When the switch is OFF, diode $D_7$ conducts current to transfer the energy to the load. Again, if the duty cycle is uniform throughout the cycle, then input current $I_{in}$ becomes sine-weighted. Again, for operation in the discontinuous mode, the maximum ON current $I_M$ of the switch M, and the current through the diode $D_7$ and the secondary of the transformer, are four times their respective peak sine currents when operating at 50% duty cycle at full load. Obviously the peak will even be higher if operated below 50% duty cycle to deliver the same output power.

Combination Mode

In the earlier two cases, the transformer, diodes and switches have to be rated for a higher RMS current rating because of the high peak current requirement. By operating the system in a mixed mode, the root mean squared (RMS) current rating of the diodes and the transformer, $X_1$, can be reduced. In this case, when $V_m$ sin $\omega t$ is less than $(N_1/N_2)V_o$ (neglecting diode drops) the system is operated only in a flyback mode and when $V_m$ sin $\omega t$ is >$(N_1/N_2)V_o$ (neglecting diode drops) the system is operated in the voltage mode and flyback mode. If we assume that half the energy requirement during this period is supplied by voltage mode and the other half by the flyback mode, then the peak current will become half for the diodes and the transformer resulting in a reduction of RMS rating of these devices.

The related theory is as follows:

$$\text{Let the input voltage } (V_{ac}) = V_m \sin \omega t \tag{2}$$

$$\text{Required Current} = i_m \sin \omega t \text{ at full load} \tag{3}$$

At t=$t_1$, let $$V_m \sin\omega t_1 = \frac{N_1}{N_2} V_o \tag{4}$$

wherein the diode drops have been neglected.

The required current at t=$t_1$ is $I_m$ sin $\omega t_1$. Let the switching frequency be high so that the variation in $V_m$ sin $\omega t$ during the switching period can be neglected. Let the duty cycle be 50% at full load and let transformer $X_1$ and inductor L operate in the discontinuous mode. Let $L_1$ be the primary inductance of transformer $X_1$ and $T_1$ be the period of the switching frequency.

Then, $$i_{L1}(T_1/2) = \frac{V_m \sin\omega t_1}{L_1} \times \frac{T_1}{2} \tag{5}$$

(assuming linear ramping)

$$I_{L1(average)} = \frac{V_m \sin\omega t_1 \times T_1}{8L_1} \tag{6}$$

If the input sine waveform has to be followed, then $$i_m \sin\omega t_1 = \frac{V_m \sin\omega t_1 \times T_1}{8L_1} \tag{7}$$

Eqn. (7) fixes the value of $L_1$.

For t>$t_1$ when M is ON, energy is transferred both to $L_1$ and L. Let L' be the secondary inductance referred to the primary side. Assuming that the required energy transfer is equally shared between L' and $L_1$ at the peak of the input waveform, then at $\omega t = \pi/2$ $$i_m = \frac{V_m \times T_2}{8L_1} + \frac{\left(V_m - \frac{N_1}{N_2}V_0\right)}{8L'} \times T_2 \qquad (8)$$

wherein $T_2$ is the new switching period. From (7), the required current is obtained as:

$$i_m = \frac{V_m T_1}{8L_1} \qquad (9)$$

Note that in the above equations, period $T_1$ corresponds to frequency $f_1$ and period $T_2$ corresponds to frequency $f_2$.

If Eqns. (8) and (9) are compared, then for equal sharing of energy between L' and $L_1$, the following conditions must be satisfied.

$$T_2 = \frac{T_1}{2}$$

as switching frequency must be doubled at $t>t_1$ $$\frac{\left(V_m - \frac{N_1}{N_2}V_0\right)}{8L'} = \frac{V_m}{8L_1} \qquad (10)$$

$$L_1\left(V_m - \frac{N_1}{N_2}V_0\right) = L'V_m$$

$$L' = L_1\left(1 - \frac{N_1}{N_2}\frac{V_0}{V_m}\right)$$

The value of L' and hence L is fixed by Eqn. (10). Under this condition the peak current requirement of the secondary and $D_5$–$D_8$ are reduced to half the value as compared to the voltage or current mode. Now, consider the duration between $t_1$ to $T_2/2$. During this interval, Eqn. (8) may be written as:

$$i_m \sin\omega t = \frac{V_m T_2}{8}\left(\frac{1}{L_1} + \frac{1}{L'}\right)\sin\omega t - \frac{\frac{N_1}{N_2}}{8L'}V_0 T_2 \qquad (11)$$

$$\text{Let } \frac{1}{L_1} + \frac{1}{L'} = \frac{1}{L_2} \qquad (12)$$

Then Eqn. (11) reduces to $$i_m \sin\omega t = \frac{V_m T_2}{8L_2}\sin\omega t - \frac{\frac{N_1}{N_2}}{8L'}V_0 T_2 \qquad (13)$$

But the required current at $t=t_1$ from (7), is $$i_m \sin\omega t_1 = \frac{V_m \sin\omega t_1 \times T_1}{8L_1} \qquad (14)$$

Resolving Eqns. (13) and (14);

$$T_2 = \frac{T_1}{\frac{L_1}{L_2} - \left(\frac{L_1}{L'}\right) \times \left(\frac{N_1}{N_2}\right) \times \left(\frac{V_0}{V_m \sin\omega t}\right)} \qquad (15)$$

Figure 7:
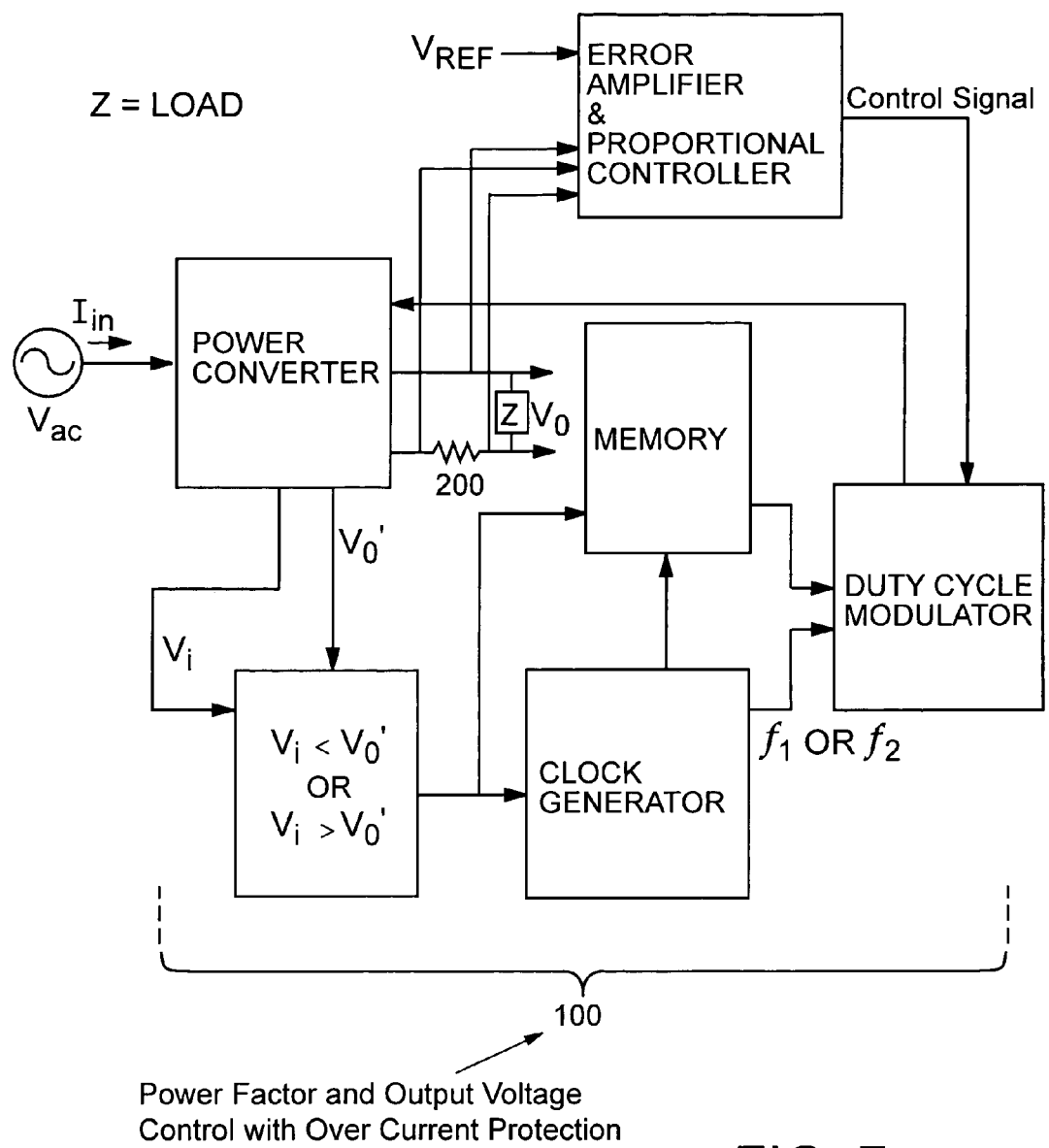
FIG. 7 is a schematic block diagram implementing the novel control strategy of FIG. 5.

As per FIGS. 5, 6 and 7, when the rectified input voltage is less than the reflected output voltage $V_o'$ (as in phase 1), the device is made to operate at 50% duty cycle at maximum load and a fixed frequency $f_1$. When the input voltage is higher than $V_o'$ (phase 2), the duty cycle is continuously modulated in a sine-weighted manner and the frequency of operation switches to $f_2$ at a time instant denoted by FCOP. The point where the first phase changes over to the second phase is called the phase changeover point (PCOP) as mentioned before. During the first phase of operation, the switching frequency is the first fixed frequency $f_1$ and during the second phase of operation, the switching frequency is the second fixed frequency $f_2$ and the changeover from the first frequency to the second frequency can be anywhere above the phase changeover point to realize good input current waveforms. FCOP may be selected using computer simulation. It is typically 20% higher than the PCOP point and is governed by the requirement that the primary peak current at any point is less than the peak current achieved at the peak of the input AC voltage. Once FCOP is fixed, the EPROM can be accordingly programmed with appropriate data. Using the theory presented in this section, a 1 kW, 48V DC output voltage converter was designed and simulated using PSPICE software. For completeness of the disclosure, and for comparison purposes between the design and the implementation in accordance with the invention, the line voltage, line current and the output voltage in accordance with the described simulation are shown in FIG. 16. The line current and voltage show a slight phase difference because a filter was used to clean up the current waveform of high-frequency components.

Hardware Implementation and the Smart Power Module

The combination mode discussed in the previous section and simulated using PSPICE, has been implemented and tested using a laboratory prototype of the designed rating.

Figure 18:
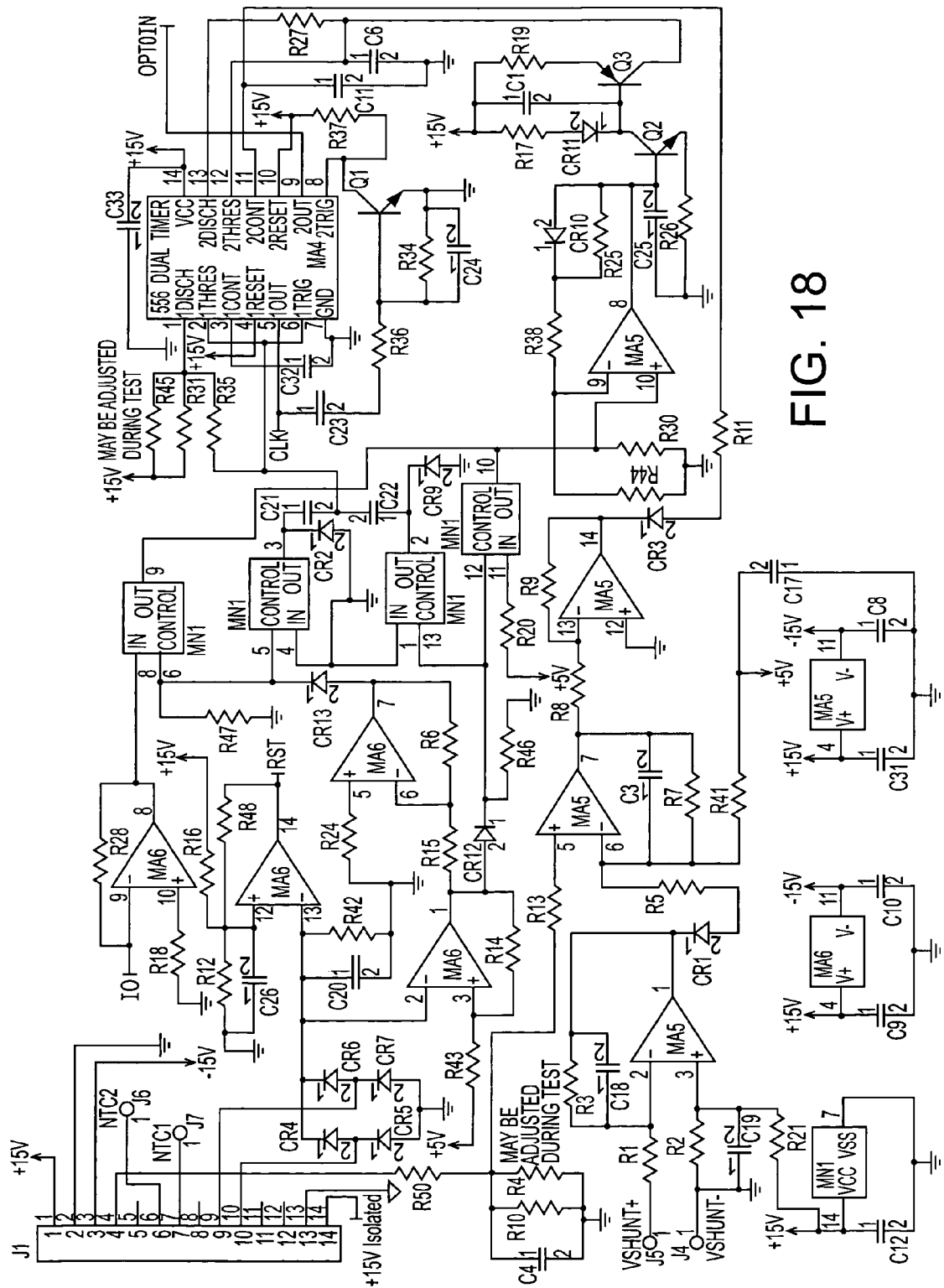
FIGS. 18 and 19 are detailed schematics of the analog and digital parts, respectively, of a working prototype of the control circuit of FIG. 8.
Figure 19:
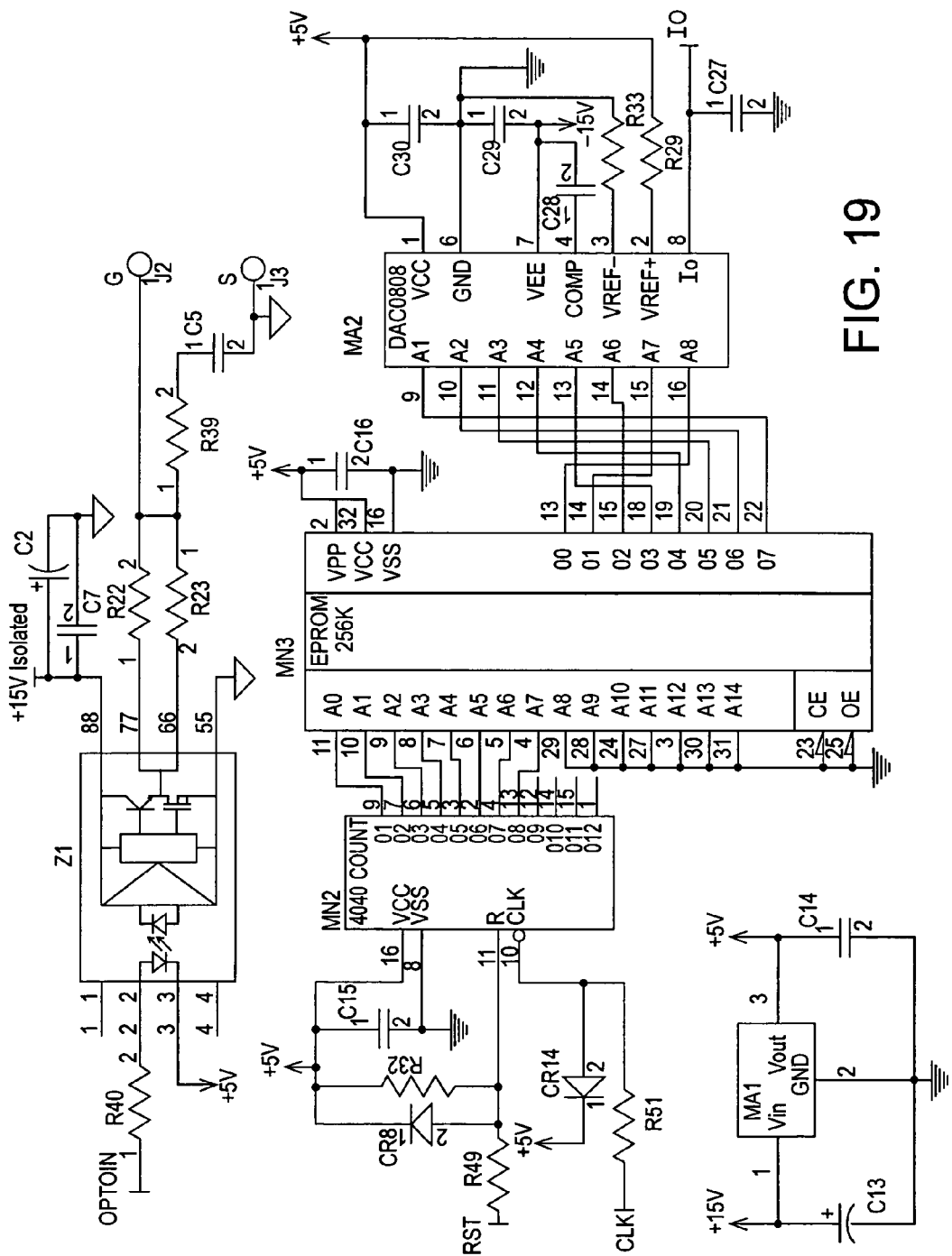

The block diagram showing the control stage 100 is shown in FIG. 7. FIG. 8 shows the hardware details of an example of the control circuit without separate FCOP and PCOP implemented. Alternatively, FCOP and PCOP can be implemented at separate time intervals as described above and shown in FIGS. 5 and 20. FIGS. 18 and 19 are detailed schematics of the analog and digital parts, respectively, of a working prototype of the control circuit of FIG. 8. The components in FIGS. 18 and 19 are identified in Tables 2 and 3.

In FIG. 8, $V_E$, the output of the comparator, is proportional to the error in the desired output DC voltage $V_o$. $I_R$ is a current proportional to reference voltage $V_{REF}$ during Phase 1 and $V_R$ during Phase 2. $V_{DR}$ is a reference voltage to operate the digital-to-analog converter (DAC). For the case where $t>t_1$ the ON time of $M_1$ is given by, $$T_{ON} = \frac{\frac{C}{2}V_E}{I_R} \qquad (16)$$

At the end of the ON time, output of switch $M_1$ goes to zero. $M_2$ is a free running clock, generating a frequency of f when capacitor C is selected and doubling the frequency when C/2 is selected. Clock $M_2$ triggers switch $M_1$ at every clock period and the ON duration ($T_{ON}$) is determined by switch $M_1$. The OFF time of switch $M_1$ should not be less than T/2, where T is the period of the switching frequency. The expression for $T_{ON}$ can also be written as:

$$T_{ON} = \frac{R_R \frac{C}{2} V_E}{V_R} \qquad (17)$$

Eqn. (17) is obtained by replacing $I_R$ with $V_R/R_R$ (during Phase 2) in Eqn. (16)

Comparing Eqns. (15) and (17) and since $T_2 = 2T_{ON}$ at the peak of the sine waveform, $$R_R C \frac{V_E}{V_R} = \frac{T_2}{\frac{L_1}{L_2} - \left(\frac{L_1}{L'}\right) \times \left(\frac{N_1}{N_2}\right) \times \left(\frac{V_o}{V_m \sin \omega t}\right)} \qquad (18)$$

In Eqn. (18), if $R_R C = T_2$, then using Eqns. (10) and (12)

$$\frac{V_E}{V_R} = 1/2 \qquad (19)$$

Thus, if $V_R$ is generated from an EPROM based voltage source where the locations are loaded corresponding to the denominator of Eqn. (18), the input current will follow the line voltage form.

From FIG. 8, those of skill in the art will appreciate that CNTR is a counter while DAC is the digital to analog converter. $I_R$ is a voltage ($V_R$) controlled current source and the clock is an IC-555. When $V_m \sin \omega t < (N_1/N_2)V_o$, then $M_2$ and $M_3$ are ON and control phase 1 is in operation. Otherwise, $M_1$ and $M_4$ are ON and control phase 2 is in operation.

$V_E$ controls the pulse width whether in Phase 1 or Phase 2 and $kV_o$ is compared with $V_{REF}$ (which is a constant DC reference voltage) only, in both Phases to generate $V_E$. During Phase 1 $V_{REF}$ itself is used to generate $I_R$, but in Phase 2, $I_R$ is controlled by $V_R$, generated by the EPROM data. $V_R$ has a waveform determined by the data stored in Table 1. This controls $I_R$ accordingly and hence the pulse width through $V_E$ at pin 5. The $V_R$ data stored in the EPROM as given in Table 1 has a shape paralleling the shape of the instantaneous AC input but not the exact value of the AC input to control the pulse width so the average of the primary current will be "sine-weighted" and have "the same nature" as the AC input voltage waveform. The value of k is fixed which is set by the user at the beginning of his experiment or application. The value of $kV_o$ varies as $V_o$ varies with load. It is compared with $V_{REF}$, where "k" is used to bring the actual $V_o$ value within a "proper range" for comparison and to make the module universal It is necessary to emphasize that the stored EPROM data does not represent the instantaneous values of the input AC waveform itself. Rather, it represents a sine-weighted string of duty cycles that the MOSFET should operate with at various time instances of the input AC waveform, so that a sinusoidal current is drawn from the input AC supply. Further, EPROM data based duty cycle modulation is made effective only during phase 2.

The sample EPROM data shown in Table 1, for the case considered, is loaded as per the following details:

Locations 0–31: Load C4H

Locations 32–157: Load Hexadecimal numbers corresponding to $$\sqrt{\left\{2.83 - \frac{1.44}{\sin(45 + n \times 0.72)}\right\}}$$

for n=1 to 125

Locations 158–256: Load C4H

This EPROM data, in conjunction with the output voltage feedback, ensures that the duty cycle variation of the MOSFET follows the same nature as the input AC waveform (i.e. it is sine-weighted), even as it responds to load variations during phase 2. This can be further understood with reference to FIGS. 7 and 8.

The overall control strategy may be described as follows: The output voltage, $V_o$, is compared with a reference voltage and the error is fed into a proportional controller. During phase 1, the control signal from the proportional controller varies the duty cycle of the monostable multivibrator feeding the gate trigger circuit of the MOSFET so as to maintain a constant output voltage under varying loads. If the load is not varying, a fixed duty cycle corresponding to the given load is maintained. During Phase 2, in addition to the output voltage regulation described in the preceding sentences, EPROM data is used (through a digital to analog converter (DAC—refer to FIG. 8) to modulate the monostable multivibrator output in a sine-weighted manner in order to draw sinusoidal input current from the AC supply. For example, 'FF' in Table I corresponds to 50% duty cycle at full load and at the peak of the AC voltage. For lesser loads, the duty cycle will be less as decided by the output of the proportional controller and accordingly the duty cycle at other instants of the AC waveform are automatically scaled so as to preserve their sine-weighted nature.

Translation into a Smart Power Module

An Application-Specific Power Module (ASPM) dedicated to the proposed configuration was implemented. This smart power module integrates the input diode bridge rectifier, the power switch and the high frequency output rectifier bridge with associated drivers and control functions. The ASPM solution brings a high level of integration, allows minimum number of external connections to offer minimum size and weight solution. Very short internal connections minimize parasitic resistance and inductance. This permits high-frequency operation with reduced voltage overshoots facilitating EMI and RFI filtering and improving overall efficiency.

Integration of Power and Control Stages

Figure 11:
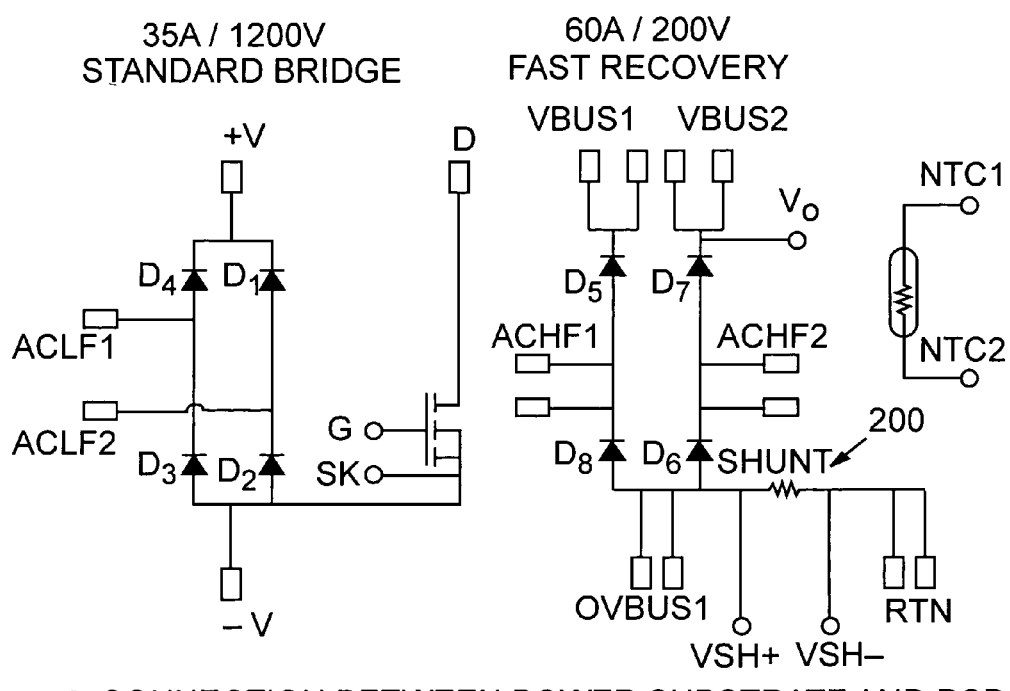
FIG. 11 is a module power part schematic/physical layout diagram depicted in FIG. 1

The components dissipating more than 1W are mounted onto a power substrate. The power stage in FIG. 10(a) shows the power substrate component footprint with the rectifiers located to the left and top right, the power switch at the center, and the shunt resistor to the lower right. It is clear to those skilled in the art that various component arrangements are possible, so long as the heat dissipation is balanced. This should be viewed with reference to FIG. 11, which shows the electrical diagram of the power components corresponding to FIG. 4. The substrate simultaneously presents a 2500VRMS isolation barrier to the heat-sink and provides optimum conduction of internally generated heat from losses in the components to the outside world. Lowest cost is achieved at 2.5 kV isolation with an Insulated Metal Substrate (IMS), other insulative thermal conducting materials such as directly bonded copper (DBC) on BeO, Alumina, or AlN may also be used. This type of substrate consists of three layers of different materials bonded together, a metal base plate of aluminum, steel or copper with thickness varying from 0.8 to 3 mm, an insulator layer 80 microns thick for 2.5 kV isolation, and a copper layer from 35 to 200 microns thick. Power semiconductors, in chip form, are then directly soldered onto the etched copper circuit patterns on the IMS for best heat conduction. "Backsides" (the soldered downsides) of the power semiconductor chips are drains for the MOSFETs and cathodes for the diodes. Topside connections are made with aluminum wires, bonded between the chips and the copper patterns to complete the circuit. Multiple wires are featured, so as to distribute current uniformly from the top surface of each chip, through the depth of the semiconductor material, then to the backside IMS heat spreader. FIG. 10(*b*) shows the PCB layout of the control stage. Extensive usage of SMD devices helps to conserve space. This control board is fastened physically at a level above the power stage as shown in the cross-sectional view of the power module in FIG. 12.

In power applications, reliability considerations dictate that the preferred practice is to employ a small number of large chips, rather than a large number of small chips, in parallel.

For MOSFET switch $M_1$ a die size up to 9×13 mm, featuring 500V/0.75 milli-Ohm characteristics, (e.g. APT50M75DLL), is used to cover the module full output power range. If fast IGBTs are used, a chip half the size of the above MOSFET can be used to handle the same current. It also makes eminent sense to incorporate the shunt resistor (200) indicated in FIGS. 4, 7, and 11 of the drawings. This shunt device available with backside metallization is soldered to the power substrate and four-wire connections are made with aluminum wire bonding, similar to the power dies. This arrangement provides excellent power management and optimum voltage feedback. The shunt resistor develops a voltage proportional to the load current, which is used for over-current protection/current limiting in the power module.

Operating temperature is a key parameter for gauging the expected mean time between failure (MTBF) of electronic equipments and this is especially critical for power semiconductors. Although careful engineering design will ensure that device temperatures under normal operating conditions are comfortably below danger levels, an accidental rise in either ambient or heat sink temperature could precipitate rapid destruction of the system.

A miniature NTC (negative temperature coefficient) thermistor (R1 in FIG. 10) placed close to the power semiconductors either feeds back heat-sink temperature to the control system, or activates an internal protection scheme, depending on the particular design. All components dissipating less than 1 W are mounted onto a printed circuit board (PCB), which itself is housed in the module body. This PCB incorporates driver, protection and control functions, implemented in SMD technology, as well as components dedicated to the galvanic isolation interface.

FIG. 12 is the cross-sectional view of the module. The various building blocks are as follows:

Module base plate (e.g. IMS substrate) 1.

Silicon chips and other power components 2, soldered to the top surface of the substrate with electrical connections made via ultrasonically bonded aluminum wires.

Molded outer wall 3.

Silicone gel conformal coating 4 over substrate assembly.

Resin top layer 5 to fill the cavity.

Internal PCB 6, with all necessary control and protection functions: hybrid SMD/chip construction extensively used.

1×1.5 solderable power connectors 7.

Small signal connectors 8. These connectors are available to the user for control circuit inputs (e.g. low voltage power supply points, DC output voltage feedback signal etc.). The choice of components, the layout and method of assembling the smart module serves to illustrate the principles of the invention. It will be obvious to one skill in the art to change the components from the above list to effect desirable results without deviating from principles of the invention. For example, the IMS can be replaced by DBC on BeO, Alumina or AlN. The base plate can have different shapes and sizes, different monitoring, protection, and control functions can be incorporated in the control PCB, different sized connectors or components, etc. can be flexibly adapted to effect the desired power rating of module design.

FIG. 13 is the top view of the module showing the pin-out. For easy access, connecting posts are placed at the periphery of the module block.

System Assembly

The assembly of a complete converter is greatly facilitated by using power module building blocks. Being galvanically isolated from the electric circuit, the module IMS base plate with a 60×108 mm footprint can be bolted to a grounded heat sink. An external board with transformer, inductor, filter capacitors and other auxiliary power supply functions completes the package. Labor costs are kept low by extending the building block concept to all elements. The external board is attached to the module with solderable power terminals. Pins measuring 1×1.5 mm are used; two pins are connected in parallel for high current outputs. Small signal liaisons are by means of feed-through connectors. No wire links are needed, so transient generating parasitics are controlled, from the control board to the power module. As a direct consequence of this rigorous approach to construction and final assembly, converter performance is both predictably high and uniform. Reproducibility is excellent over very long production runs.

Experimental Results

Figure 14:
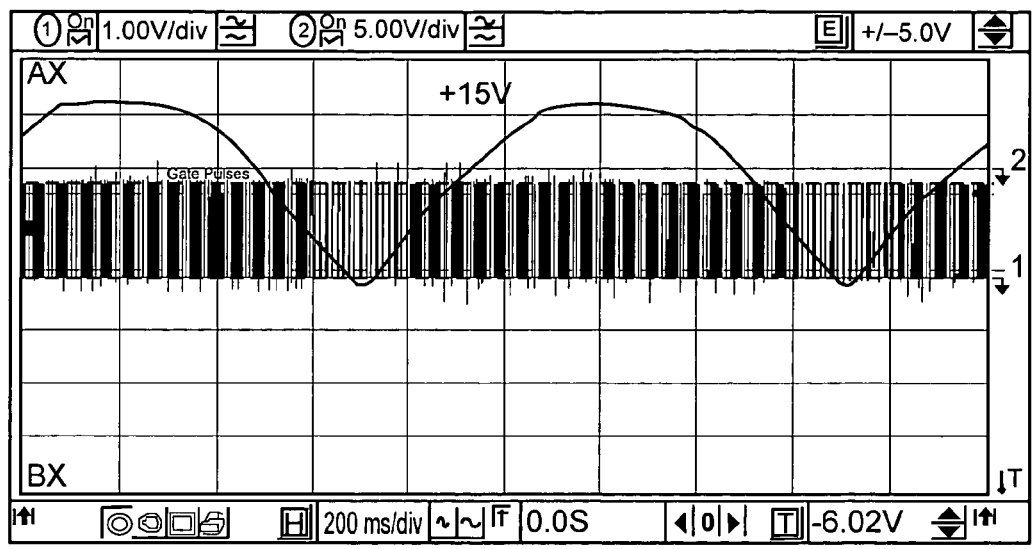
FIG. 14 is an oscilloscope trace illustrating the rectified input AC voltage and the gating pulses in accordance with the invention.

A laboratory prototype was fabricated to test the proposed configuration and the control scheme discussed in the previous sections. It was tested at a power level of up to 350 W. FIG. 14, which shows the gating waveforms applied to the main power device, is representative of the manner in which the frequency and duty cycle control is varied over the rectified input AC voltage cycle, operated at two fixed frequencies depending on the relative magnitude of the instantaneous input voltage and the reflected DC output voltage. The wattage of the prototype at 350 W is due to the availability of piece parts at the time and the time constraint under which to produce a working model to demonstrate the principles of the invention and not a real limitation of the invention itself.

Figure 15:
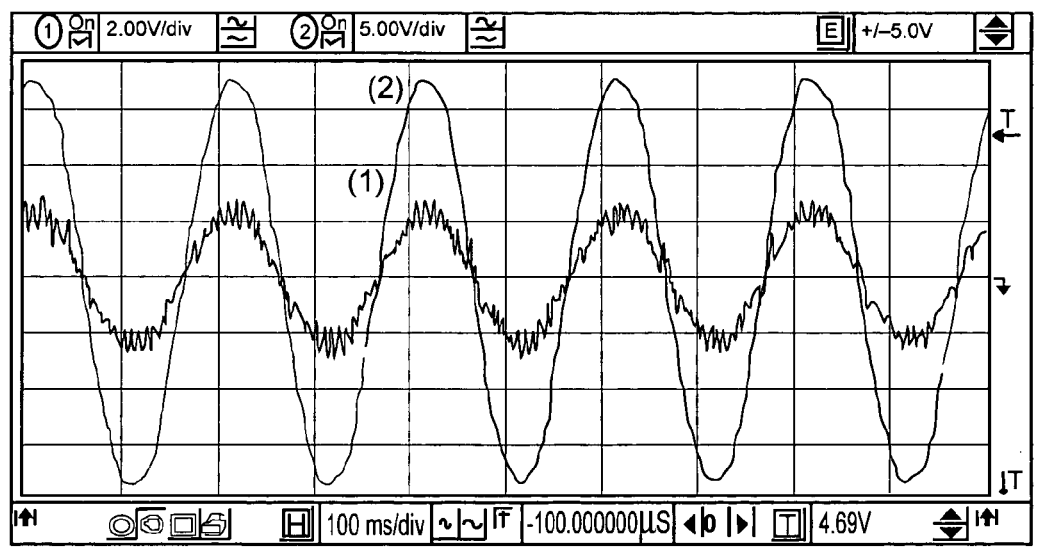
FIG. 15 is another oscilloscope trace illustrating line current and line voltage in accordance with the invention.

FIG. 15 shows the line current waveform along with the line voltage. As can be seen, the line current has negligible harmonic distortion.

FIG. 15 illustrates Line current (curve (1), y-axis: 1 div.=2.3 A, including the transducer gain factor) and Scaled down line voltage (curve (2), y-axis: 1 div.=5V) of the prototype module. Those of skill in the art will appreciate how well the invention in its actual preferred embodiment performs in accordance with the PSPICE design simulation (although the simulation is for 1 kW, the waveforms nonetheless behave essentially the same), results of which are shown in FIG. 16, as described in conjunction with the drawings.

Summary of the Basic Concept

A state-of-the-art smart power module has been developed based on a new power converter configuration. The proposed single stage, single switch converter employs a simple control scheme to provide a regulated DC output voltage and operates at high input power factor. A THD of less than 5% as stipulated by regulatory agencies is easily achieved with the proposed control using duty cycle control featuring two discrete operating frequencies. As per FIGS. 5 and 6, when the rectified input voltage is less than the reflected output voltage (as in phase 1), the duty cycle is maintained close to 50% at full load and less than 50% duty cycle for lighter loads while the operating frequency is held constant at $f_1$. When the rectified input voltage becomes larger than the reflected output voltage (as in phase2), and the operating frequency is changed to another constant value ($f_2$) at a suitable point (FCOP). This provides a significant improvement in the harmonic distortion of the line current. Further, the peak current stress on the devices is reduced with the proposed dual frequency scheme.

All the details of the design and fabrication of the smart power module have been presented. The module is specifically suitable for low DC voltage (buck) applications. Using the theory presented, a 1 kW, 48V DC output voltage converter was designed and simulated using PSPICE software.

Those of skill in the art will appreciate that other suitable circuit topologies in keeping with the teachings herein are contemplated as being within the spirit and scope of the invention. Those of skill also will appreciate that certain circuit and material details are illustrative and may be changed without departing from the spirit and scope of the invention. Thus the following further detailed discussion of certain design particulars is intended to elucidate one embodiment of the invention and not to represent a limitation placed on the broad scope of the invention.

Design of the Magnetics [50]:

a. Transformer: (Area-Product Approach Has Been Used for the Design)

The Area Product ($A_p$) expression for a flyback converter, operating in complete energy transfer mode, has been used in the design as it is considered to adequately represent the hybrid topology proposed in the invention. The relation is given by:

$$A_P = A_C \times A_W = \frac{P_O \left[ \frac{1}{\eta} \sqrt{\frac{4D}{3}} + \sqrt{\frac{4(1-D)}{3}} \right]}{K_W \times J \times B_m \times f_s} \quad (20)$$

wherein $A_c$ is the core cross-sectional area, $A_w$ is the core's window area, $P_o$ is the output power (500 W over-design used in illustrating the invention), D is the duty cycle (maximum allowed=50% in accordance with one embodiment of the invention), $\eta$ is the transformer efficiency (assume 90%), $K_W$ (typ. value: 0.4) is the window utilization factor, J (typ. value: $3 \times 10^6$ A/m$^2$) is the current density, $B_m$ (typ. value 0.2 T for ferrite core) is the maximum flux density and $f_s$ (25 kHz in one embodiment) is the switching frequency.

Thus:

$$A_P = \frac{500 \times \left[ \frac{1}{0.9} \sqrt{\frac{4 \times 0.5}{3}} + \sqrt{\frac{4 \times (1-0.5)}{3}} \right]}{(0.4) \times (3 \times 10^6) \times (0.2) \times (25 \times 10^3)} = 144 \times 10^{-9} \ m^4 \quad (21)$$

The standard tables for the CEL HP$_3$C grade EE cores are used to determine the standard, available core, that will provide the required $A_p$ calculated above. It was observed that the largest standard core available is E65/32/13 with $A^p = 143 \times 10^{-9}$ m$^4$ which is inadequate for our purposes. Hence, it was initially thought to combine two pairs of E42/21/20 (tightly couple them to reduce the resulting air-gaps) to realize a single, bigger pair. From the standard tables, $A_c$ for E42/21/20=$2.35 \times 10^{-4}$m$^2$ (i.e. $4.70 \times 10^{-4}$ m$^2$ for the combination).

The following expression is used for determining the transformer's primary number of turns:

$$N_P = \frac{DE_{1m}}{A_C \times \Delta B \times f_s} \quad (22)$$

wherein $E_{1m}$ is the maximum voltage applied to the primary (280V) and $\Delta B$ is the flux swing (which in turns out to be $B_m$=0.2 T itself). Thus:

$$N_P = \frac{0.5 \times 280}{4.70 \times 10^{-4} \times 0.2 \times 25 \times 10^3} \approx 60 \quad (23)$$

Since, the transformer turns ratio is 4:1, secondary no. of turns, $N_s \approx 60/4 \approx 15$.

Those of skill in the art will appreciate that it is desirable to determine whether the core will accommodate the winding or not, thus:

$$K_W \times A_W \geq N_P \times a_P + N_S \times a_S \quad (24)$$

wherein $a_P$ and $a_S$ are the cross-section areas of the wires used for winding the primary and secondary respectively. If the primary current is $I_P$ and secondary current is $I_S$, then the last equation may be re-written as:

$$K_W \times A_W \geq N_P \times \frac{I_P}{J} + N_s \times \frac{I_S}{J} \quad (25)$$

Substituting the values from the instant design, $$0.4 \times 2.56 \times 10^{-4} \geq 60 \times \frac{4.5}{3 \times 10^6} + 15 \times \frac{12}{3 \times 10^6} \quad (26)$$

These calculations indicate it may not be possible to fit the required number of turns in this "core-pair-combination" also (although it depends on a number of factors like the quality of wire used and the expertise with which the transformer is wound). Accordingly, a combination of two pairs of E65/32/13 (tightly couple them to reduce the resulting air-gaps) EE cores was used instead of a single, bigger pair. The area of cross section, $A_c$, for this combination comes out to be $2 \times 2.66 \times 10^{-4}$ m². Using this value in (3) yields: $N_p \approx 53$ and so $N_s \approx 13$. Further, it is preferred that a suitable air-gap be inserted to realize an inductance of 0.562 mH. It is also preferred that litz or multi-strand wire of suitable gauge (depending on the current rating provided) be used for windings.

b. Inductor:

The governing area-product relation for the design of inductor is:

$$A_P = A_C \times A_W = \frac{2E}{K_W \times J \times B_m \times K_C} \quad (27)$$

wherein $$K_C = \frac{I_{peak}}{I_{rms}} = \frac{9\sqrt{2}}{9} = \sqrt{2}$$

and $$E = \frac{1}{2}LI_{peak}^2 = \frac{1}{2} \times 9 \times 10^{-6} \times (9\sqrt{2})^2 = 0.729 \text{ mJ} \quad (28)$$

So, $$A_P = \frac{2 \times 729 \times 10^{-6}}{0.4 \times 3 \times 10^6 \times 0.2 \times \sqrt{2}} = \quad (29)$$

$$4.29 \times 10^{-9} \text{ m}^4 = 4.29 \times 10^3 \text{ mm}^4 = 4.29 \times 10^{-9} \text{ m}^4$$

From the standard tables for the CEL HP₃C grade EE cores, one of ordinary skill in the art would think that core E30/15/7 may be used. This core has an $A_C = 0.6 \times 10^{-4}$ m². In actual practice, however, it is preferred that an EE core E 42/21/15 be used for the inductor with about eleven turns. This embodiment provides an air-gap≈5 mm (which may be adjusted slightly to obtain the desired 9 A H). It is also preferred to use any appropriate wire gauge to carry 9A current. Finally, it is preferred that litz or multi-strand wire be used for winding the inductor.

Programming the EPROM:

A sample EPROM coding is indicated by Table 1 below for each of four quadrants with hexadecimal (H) data in sequential hexadecimal addresses, as will be described. The EPROM data is effective only during phase 2. Phase 1 and Phase 2 are decided based on the comparison of $V_i$ and $V_o'$ which controls the opening and closing of the switches M1 through M4 in FIG. 8.

If there is a sag and if the control part is able to respond to this, then in the input current waveform also there will be a proportionate sag. Load conditions are taken care of by the controller.

TABLE 1

| Location | Data |
| --- | --- |
| P 0000H | C4H |
| 0001 | C4 |
| 0002 | C4 |
| 0003 | C4 |
| 0004 | C4 |
| 0005 | C4 |
| 0006 | C4 |
| 0007 | C4 |
| 0008 | C4 |
| 0009 | C4 |
| 000A | C4 |
| 000B | C4 |
| 000C | C4 |
| 000D | C4 |
| 000E | C4 |
| 000F | C4 |
| 0010 | C4 |
| 0011 | C4 |
| 0012 | C4 |
| 0013 | C4 |
| 0014 | C4 |
| 0015 | C4 |
| 0016 | C4 |
| 0017 | C4 |
| 0018 | C4 |
| 0019 | C4 |
| 001A | C4 |
| 001B | C4 |
| 001C | C4 |
| 01D | C4 |
| 001E | C4 |
| 001F | C4 |
| 0020 | C4 |
| 0021 | C7 |
| 0022 | CA |
| 0023 | CD |
| 0024 | CF |
| 0025 | D0 |
| 0026 | D4 |
| 0027 | D6 |
| 0028 | D8 |
| 0029 | DA |
| 002A | DC |
| 002B | DE |
| 002C | DF |
| 002D | E1 |
| 002E | E3 |
| 002F | E4 |
| 0030 | E6 |
| 0031 | E7 |
| 0032 | E8 |
| 0033 | EA |
| 0034 | EB |
| 0035 | EC |
| 0036 | ED |
| 0037 | EE |
| 0038 | EF |
| 0039 | F0 |
| 003A | F1 |
| 003B | F2 |
| 003C | F3 |
| 003D | F4 |
| 003E | F5 |
| 003F | E5 |
| 0040 | F6 |
| 0041 | F7 |
| 0042 | F8 |
| 0043 | F8 |
| 0044 | F9 |
| 0045 | F9 |
| 0046 | FA |
| 0047 | FA |

TABLE 1-continued

| Location | Data |
|---|---|
| 0048 | FB |
| 0049 | FB |
| 004A | FC |
| 004B | FC |
| 004C | FD |
| 004D | FD |
| 004E | FD |
| 004F | FE |
| 0050 | FE |
| 0051 | FE |
| 0052 | FF |
| 0053 | FF |
| 0054 | FF |
| 0055 | FF |
| 0056 | FF |
| 0057 | FF |
| 0058 | FF |
| 0059 | FF |
| 005A | FF |
| 005B | FF |
| 005C | FF |
| 005D | FF |
| 005E | FF |
| 005FH | FFH Q |

Those of skill in the art will appreciate that the EPROM is loaded with data corresponding to the following formula derived earlier:

$$R_R C \frac{V_E}{V_R} = \frac{T_2}{\frac{L_1}{L_2} - \left(\frac{L_1}{L'}\right) \times \left(\frac{N_1}{N_2}\right) \times \left(\frac{V_o}{V_m \sin \omega t}\right)} \quad (30)$$

It may be re-iterated that the stored EPROM data does not represent the instantaneous values of the input AC voltage waveform itself. Rather, it represents a sine-weighted string of duty cycles that the MOSFET should operate with at various time instants of the input AC waveform, so that a sinusoidal current is drawn from the input AC supply. The data for the first quarter of the rectified sine wave (0° to 90°) is given in Table 1 (going from P to Q). For the second quarter of the sine wave (90° to 180°) the same data are programmed in reverse order, starting from the location 0060H, going backwards (going from Q to P). The locations still remaining un-programmed, are programmed with C4H.

If there is a line frequency drift, it will vary the data length taken from the EPROM. The overall operation will not get affected. 400 Hz operation, as in an airplane, is possible with the proposed PFC scheme. But the modulation frequency should preferably be increased to reduce the filter voltage drop and the EPROM data should be suitably changed.

Frequency Changeover Point and Duty Ratio

The FCOP and PCOP points can be refined to occur at different points on $V_i$ to effect smoother transition from Phase 1 to Phase 2 as given in the following example to determine the appropriate EPROM data necessary for controlling the pulse duty ratio at the FCOP and beyond. FIG. 20, shows the variation of $V_i$, the rectified input AC voltage. Let $\theta_1$ be the angle, corresponding to the phase change over point (PCOP) at which, $$V_m \sin \theta_1 = \frac{N_1}{N_2} V_0 = V'_0 \quad (31)$$

where, $$\frac{N_1}{N_2} = \frac{\text{Primary}}{\text{Secondary}}$$

is ratio of the high frequency transformer.

$\theta_1$ is the angle beyond which the EPROM decides the 'ON' width controlled by the error signal (generated by a comparison of the output voltage and reference output voltage). Let $\theta_2$ be the angle at which frequency is doubled (called the frequency change over point, FCOP).

For the circuit designed to demonstrate the invention shown in FIGS. 6 and 14, the first frequency occurring from 0 to $\theta_1$ at $f_1$=12.5 kHz and the second frequency, from $\theta_2$ to $$\frac{\pi}{2},$$

at $f_2$=25 kHz. Frequency changeover for $$\theta > \frac{\pi}{2}$$

to $\theta=\pi$, where $f_2$ reverts back to $f_1$, mirrors the above condition in reverse order. The process repeats itself for the subsequent half cycles.

Let the input current $I_{in} = i_m \sin \theta$ (32)

At $\theta_1$, $I_{in} = i_m \sin \theta_1$ and max. pulse width duty cycle $D_{\theta_1} = 0.5$;

Let $L_1$ be the inductance of the primary.

Hence, $$i_m \sin \theta_1 = \frac{V_m \sin \theta_1}{2 L_1} D_{\theta_1}^2 T_1 \quad (33)$$

For, $\theta > \theta_1$ and DCM; Let L' be reflected inductance from the secondary $$i_m \sin \theta = \frac{V_m \sin \theta D^2 T_1}{2 L_1} + \frac{\left(V_m \sin \theta - \frac{N_1}{N_2} V_0\right) D^2 T_1}{2 L'} \quad (34)$$

Let $L'=L_1/4$; then $$i_m \sin\theta = \frac{V_m \sin\theta D^2 T_1}{2L_1} + \frac{\left(V_m \sin\theta - \frac{N_1}{N_2}V_0\right)D^2 T_1}{\frac{L_1}{2}} \quad (35)$$

$$= \frac{5}{2}\frac{V_m \sin\theta D^2 T_1}{L_1} - \frac{\left(\frac{N_1}{N_2}\right)V_0 2 D^2 T_1}{L_1}$$

At $\theta_1$ substituting $D_{\theta_1}=0.5$ in Eqn. (33)

$$i_m \sin\theta_1 = \frac{V_m \sin\theta_1}{8 L_1 f_1} \quad (36)$$

Hence, at $\theta_2$ $$i_m \sin\theta_2 = \frac{V_m \sin\theta_2}{8 L_1 f_1} \quad (37)$$

Substituting Eqn. (37) into Eqn. (35) for smooth energy flow across the FCOP point, $$\frac{V_m \sin\theta_2}{8 L_1 f_1} = \frac{5}{2}\frac{V_m \sin\theta_2 D^2}{L_1 f_1} - \frac{\left(\frac{N_1}{N_2}\right)V_0^2 D^2}{L_1 f_1} \quad (38)$$

$$\frac{V_m \sin\theta_2}{8} = \left\{2.5 V_m \sin\theta_2 - 2\left(\frac{N_1}{N_2}\right)V_0\right\} D^2$$

Since, Eqn. (38) is independent of f, this equation is valid for $\theta_1 < \theta < \pi/2$, and $$D = \sqrt{\frac{V_m \sin\theta}{8\left\{2.5 V_m \sin\theta - 2\left(\frac{N_1}{N_2}\right)V_0\right\}}} \quad \text{for } \theta_1 < \theta < (180-\theta_1) \quad (39)$$

provides the equation for the duty ratio in Phase 2.

As has been mentioned earlier, the peak currents in the secondary side can be reduced if the current contributed by the flyback action equals that of the forward action. If there is only flyback action, the peak current is given from Eqn. (33) namely $$i_m = \frac{V_m D_{90}^2}{2 L_1} T_1 \quad (40)$$

In Eqn (40) $D_{90}$ is the duty cycle at 90° which is known from equation given below:

$$\max D_{90} = \frac{V_m \sin\theta_1}{V_m} \times 0.5$$

Hence, from Eqn. (40), for a given $D_{90}$, the current contribution from flyback action will be half if $T_1$ is changed to $T_1/2$, i.e. if the frequency is changed to $2f_1$ Advantages of the Invention (a) The proposed scheme employs duty cycle control in conjunction with two discrete operating frequencies. It does not require a continuous variation of operating frequency.

(b) The proposed control strategy, in conjunction with the power circuit stage used, helps to reduce the peak current stress on the secondary of the transformer (including the devices present on the secondary side).

(c) The proposed control strategy, while simple, effectively reduces THD to between 1% and 2%.

(d) Since the "control stage" is integrated into the module, the user does not need to concern with designing the control circuit.

(e) The strategy is quite flexible in accommodating any output voltage settings desired by the user.

(f) The control strategy works with 115V/60 Hz, 230V/50 Hz or other frequency systems equally effectively.

(g) Since most applications involve a large filter capacitor at the output (not to speak of the battery applications), the disadvantage of low-frequency ripple in the output is minimized because power is drawn throughout the cycle.

(h) The control idea may work the best with the hybrid topology of FIG. 4, but may work reasonably well with a flyback converter system also. The disadvantage (namely high peak currents when operating in discontinuous current mode) is reduced to a great extent by using the proposed dual frequency control technique. But the performance will not be as good as with the hybrid topology in terms of peak current stress and EMI/RFI.

(i) In case of very low output voltage applications (typically 5V), the voltage drops across the output fast recovery diodes may become significant. It is recommended to use Schottky diodes in such a situation. The proposed control scheme works equally well and causes no disadvantages in such an application.

(j) With respect to (i) above, one might resort to "synchronous output rectification" technique in which the output diodes may be replaced with controlled devices (like Field Effect Transistors—FETs). With the advancement in technology, low voltage drop and low gate charge devices are now available, which might give them an edge over Schottky diodes for extremely low output voltage (typ. 2–3V) applications. Control for the synchronous rectifiers is synchronized with the primary side control. Our proposed control strategy would work equally well in this case also.

(k) The control strategy can be adopted for various types of power supply applications because it can boost or buck the supply voltage. The various applications are battery charging, DC drives, magnet power supplies, lab power supplies, computer power supplies and wherever a DC supply is needed.

(l) Since the secondary side current rating is reduced with the proposed control, the volume occupied by the magnetics will be reduced. Therefore, for a given power requirement, the proposed control strategy will lead to power supplies more suitable for space-sensitive applications.

(m) The proposed control scheme renders the system highly suitable for applications where EMI/EMC is a critical issue. This is because of the following two merits:

(a) Because of near unity power factor operation, the power converter does not spill any noise into the AC mains.

(b) Since the proposed control scheme alternates between two operating frequencies, the high frequency spectrum of the noise spreads out resulting in an overall reduction of the noise dB level.

To highlight the superiority of the invented control scheme, FIG. 9 contrasts the performance of a conventional flyback converter with the converter scheme of the present invention under similar operating conditions. For the flyback converter, $f_{switch}=25$ kHz, while for the proposed control scheme (in conjunction with the dual, hybrid converter) $f_{switch}=12.5$ kHz and 25 kHz (since the converter has a dual frequency operation). The transformer ratio=4:1 for both cases.

Those of skill in the art will appreciate that:

(a) In the flyback case, as seen from FIG. 9, for an average current of 9.6 A, the RMS current is 14.7 A (peak current=33.4 A). For the proposed control scheme applied to the hybrid converter, for the same average current of 9.6 A, the RMS current is only 11 A (peak current=19.2 A), which is a substantial reduction in the secondary RMS current rating by 25% (and peak current by 42.5%)

(b) In addition to (a), the conduction duration when $V_{in}$ is proportional to the reflected DC voltage is about 35 μsec. Hence, controllability at lighter loads is improved, leading to very suitable waveforms in this region.

The disclosed control strategy reduces the peak currents in the secondary of the transformer and the diodes to nearly 60% that of the flyback or voltage mode converters.

In summary, the present invention utilizes a novel power factor correction scheme combining duty cycle and frequency control as depicted in FIG. 5. This control scheme is applied to a hybrid power circuit topology (depicted in FIG. 4) resulting in a single-stage, single-switch power factor correction configuration. Under this control scheme, the converter operates with a constant duty cycle with operating frequency $f_1$ for a given load condition in phase 1, while it operates at a frequency $f_2=2.\times f_1$ and with modulated duty cycle during phase 2, with the frequency changeover from $f_1$ to $f_2$ taking place at some suitable point to achieve a good power factor.

This is a significant improvement over an earlier control scheme [15], which used a single, constant frequency and two fixed duty cycles, depending on the comparison of the rectified input voltage and the reflected output voltage (i.e. phase 1 or phase 2). It should be noted that in accordance with the novel strategy proposed herein, only two discrete operating frequencies are used along with duty cycle control. Continuous variable frequency control is not needed. Thus the control is not complex and cost is lower.

The invented improvement results in a drastic reduction of input harmonics and EMI (because of bi-frequency operation, the noise spectrum spreads out). The proposed configuration has the great advantage of reduced peak current stresses on the devices and therefore reduced weight and volume of the magnetics required for a given application. This makes the invention attractive for applications where volume and weight are major considerations. Besides, the control scheme is equally applicable in related applications like synchronous output rectification (needed for very low output voltage applications).

The proposed configuration is specifically suited for 'buck' applications where low DC output voltage (e.g. 24V, 48V) is needed. For example, this configuration will be of interest to industries associated with battery charging and UPS design and fabrication work. In view of the anticipated wide application of the proposed configuration, it has been integrated into a smart power module. The module integrates the power stage and the control stage into a single compact and reliable power system.

Although the exemplary smart module for illustrating the principles underlining the invention operates at 50 Hz to 60 Hz, the invention can also be applied to higher frequency applications. It should be noted, however, when the utility frequency increases, the switching frequency should preferably be increased to ensure low filter voltage drops. Ultimately, the highest frequency the invention can be applied to will be restricted by the availability of high frequency high power switches.

Having described and illustrated the principles of the invention in a preferred embodiment thereof, it should be apparent that the invention can be modified in arrangement and detail without departing from the principles disclosed. We claim all modifications and variation coming within the spirit and scope of the following claims.

TABLE 2

PRINTED CIRCUIT BOARD

| Designation | Type | Reference |
| --- | --- | --- |
| Chip Resistors | 10 R/0.25 W | R22, R23 |
| Chip Resistors | 10 R/0.125 W | R39 |
| Chip Resistors | 100/0.125 W | R27 |
| Chip Resistors | 1K/0.125 W | R1, R2, R13, R18, R34, R35, R40, R41, R43, R50 |
| Chip Resistors | 10K/0.125 W | R3, R6, R8, R9, R15 R25, R28, R30, R37, R38, R42, R44, R46, R47 |
| Chip Resistors | 100K/0.125 W | R7 |
| Chip Resistors | 12K/0.125 W | R49 |
| Chip Resistors | 150K/0.125 W | R21, R48 |
| Chip Resistors | 2.2K/0.125 W | R17, R19, R26 |
| Chip Resistors | 220K/0.125 W | R14, R25 |
| Chip Resistors | 3.3K/0.125 W | R51 |
| Chip Resistors | 470 R/0.125 W | R12 |
| Chip Resistors | 4.7K/0.125 W | R5, R10, R11, R29, R31, R33 |
| Chip Resistors | 47K/0.125 W | R16 |
| Chip Resistors | 5.6K/0.125 W | R24, R32, R36 |
| Chip Resistors | 6.8K/0.125 W | R19 |
| Chip Resistors | 8.2K/0.125 W | R20 |
| Ceramic Capacitors | 100 pF 50 V X7R | C1, C18, C19, C25 |
| Ceramic Capacitors | 1 nF 50 V X7R | C4, C24, C26, C27, C28 |
| Ceramic Capacitors | 10 nF 50 V X7R | C5, C20, C21, |
| Ceramic Capacitors | 100 nF 50 V X7R | C7, C8, C9, C10, C11, C12, C14, C15, C16, C17, C29, C30, C31, C32, C33 |
| Ceramic Capacitors | 22 nF 50 V X7R | C22 |
| Ceramic Capacitors | 3.3 nF 50 V X7R | C6 |
| Ceramic Capacitors | 4.7 nF 50 V X7R | C23 |
| Ceramic Capacitors | 47 nF 50 V X7R | C3 |
| Tantalum Capacitors | 33 μF 25 V | C2 |
| Tantalum Capacitors | 6.8 μF 35 V | C13 |
| Diode | LL4148 | CR1 to CR14 |
| NPN Transistor | SO2222A 45 V | Q1, Q2 |
| PNP Transistor | SO2907A 45 V | Q3 |
| Timing Circuit | NE556D/SGS, TI | MA4 |
| Optocoupler/Driver | HCPL3120/Agilent | Z1 |

TABLE 2-continued

PRINTED CIRCUIT BOARD

| Designation | Type | Reference |
|---|---|---|
| 5 V Voltage Regulator | 78M05Z/On Semi | MA1 |
| Quad operational Amplifier | LM324D/On Semi | MA5, MA6 |
| OTC EPROM 32Kx8 | AM27C256/AMD, STM | MN3 |
| 8 bit D/A Converter | DAC0808LCM/ National Semi | MA2 |
| 12 Bit Binary Counter | MC14040BD/On Semi | MN2 |
| Quad Analog Switch | MC14066BD/On Semi | MN1 |
| Potentiometer | 3296W47K/Bourns | P1 |
| Signal Connector | Comatel 14 pts/ Comatel | J1 |
| PC Board MC4 Adjusted during Test if necessary | 71 × 48 mm | R4, R45 |

TABLE 3

POWER PART

| MOSFET 500 V 100 mohms | APT5010DVR/APT | Q1 |
|---|---|---|
| Schottky Diodes 100 V 60 A | DWS32–100/IXYS | CR5, CR6, CR7, CR8 |
| Rectifier Diodes 1200 V 35 A | DWP 35–12/18/IXYS | CR1, CR2, CR3, CR4 |
| 10 W Shunt Resistor | PMB0.01R/10 W/ Isabellenhutte | R1 |
| NTC Thermistor | 68K/0.125 W/LCC | R2 |
| Power Connectors | | |
| Signal Connectors | | |
| JP6 Wall | MP0083A | |
| IMS Substrate A13 mm Cu70 μm | MSxxxx/Berquist | |

The invention claimed is:

1. Power generator apparatus for converting an alternating current (AC) input to a direct current (DC) output, the apparatus comprising:
    a clock generator;
    a power switching device gated by the clock generator and coupled to the alternating current (AC) input to generate regulated DC output power;
    a memory device storing digitized reference data, wherein said stored digitized reference data is a time sequence representation of a string of duty cycles which the power switching device must operate in accordance with the characteristics of the AC input voltage to pulse-width modulate the duty cycle; and
    means for comparing the alternating current (AC) input and DC output to effect power circuit function between operating in a first phase at a first frequency and operating in a second phase at a second frequency;
    said reference data in said memory device being used to continuously pulse-width modulate (PWM) a duty cycle of a gating signal from the clock generator to the power switch during said second phase.

2. The power generator apparatus according to claim 1 including means for switching from a fixed duty ratio to a continuously pulse-width modulated (PWM) duty ratio of the gating signal and in transitioning from a first frequency to a second frequency.

3. The power generator apparatus according to claim 1 wherein the AC input current is substantially in phase and in waveshape relative to the AC input voltage such that the power factor presented back to the utility is near unity.

4. The power generator apparatus according to claim 1 wherein said first phase at said first frequency is operating in flyback mode and said second phase is operating in both flyback and forward conversion mode.

5. The power generator apparatus according to claim 1 wherein both said first and said second phases are operated in flyback mode.

6. The power generator apparatus according to claim 1 wherein the duty cycle of said first phase at said first frequency is modulated by an error signal comprising the difference between a first voltage which is the regulated output voltage $V_o$ and a second reference voltage $V_{REF}$ such that the duty cycle is varied to maintain a constant output voltage under varying loads.

7. The power generator apparatus according to claim 1, wherein the power switching device is operated at a maximum of 50% duty ratio at full load during the first phase.

8. The power generator apparatus according to claim 1 wherein the input to output voltage ratio is in a range of 5:1 or more.

9. The power generator apparatus according to claim 2 wherein the means for switching in transitioning from the first frequency to the second frequency in the second phase includes means for comparing a rectified input AC voltage and a reference point FCOP to minimize distortion and maintain near unity power factor.

10. The power generator apparatus of claim 2, in which the switching means includes controls operable such that said first phase of operation is when the value of the output voltage reflected back to the input is higher than the absolute value of the instantaneous AC input voltage and said second phase of operation is when the value of the output voltage reflected back to the input is lower than or equal to the absolute value of the instantaneous AC input voltage, wherein during said second phase the operating frequency transitioning from said first frequency to said second frequency is higher than said first frequency.

11. The power generator apparatus according to claim 1, wherein the switching frequency for operating said first phase is equal to approximately 12.5 kHz for 50 Hz to 60 Hz utility.

12. The power generator apparatus according to claim 1, wherein the switching frequency for operating said first phase is equal to approximately 80 kHz for 400 Hz utility.

13. The power generator apparatus of claim 1, wherein said second frequency is approximately twice the said first frequency.

14. The power generator apparatus of claim 1, wherein said first phase of operation is approximately centered around a zero-crossing of the AC input waveform and wherein said second phase of operation is present in the rest of the input AC cycle complementary thereto.

15. The apparatus of claim 1 further comprising:
    a transformer including a primary winding in series with the power switching device and a secondary winding;
    plural diodes operatively coupled to said primary winding to effect rectification of the AC input;
    plural diodes operatively coupled to said secondary winding to perform a rectification function on the output of the secondary winding;

an inductor operatively coupled to the output of said plural diodes operatively coupled to said secondary winding; and a capacitor across the output to be connected in parallel with the load.

16. The apparatus of claim 15 wherein the rectification function on the output of the secondary winding of the transformer is accomplished through using either Schottky diodes or synchronous rectification.

17. The apparatus of claim 15 wherein said inductor on the secondary having terminals connected to the cathode of each of the top bridge rectifier diodes; and the cathode of the top bridge rectifier diode attached to the negative polarity of the secondary winding of the transformer further connecting to the output capacitor to equally share in delivering energy to the load by the transformer and the secondary inductor in phase 2 operation.

18. The apparatus according to claim 17 in which the transformer and inductor are mutually sized to share energy equally to reduce weight and volume of the transformer and the inductor.

19. Power generator apparatus for converting an alternating current (AC) input to a regulated direct current (DC) output, the apparatus comprising:

a power generator circuit including a single power switching device coupled to said AC input for generating regulated DC output power;

a clock generator providing a clock signal;

means for comparing the AC input and DC output to effect power circuit function by varying the clock rate between operating in a first phase at a first fixed frequency and operating in a second phase at a second fixed frequency;

means for switching from the first fixed frequency to the second fixed frequency, wherein the switching means includes controls operable such that said first phase of operation is when the value of the output voltage reflected back to the input is higher than the absolute value of the instantaneous AC input voltage and said second phase of operation is when the value of the output voltage reflected back to the input is lower than or equal to the absolute value of the instantaneous AC input voltage;

a memory device storing at least representative portions of digitized reference data; and control means using said data to continuously pulse-width modulate the duty cycle of the clock signal to said power switching device during said second phase.

20. The power generator apparatus of claim 19 wherein the second operating frequency of the second phase is higher than the operating frequency of the first phase leading to reduced peak currents and stresses in the power generator circuit.

21. The power generator apparatus of claim 20 including a transformer wherein the second operating frequency of the second phase is higher than the operating frequency of the first phase leading to reduction in system weight and volume.

22. The power generator apparatus of claim 19 in which the clock generator is operative to employ two discrete frequencies in its operation within any given AC cycle to spread the noise spectrum and reduce the magnitude of its total harmonic content and EMI/RFI effects.

23. The power generator apparatus according to claim 19 further comprising:

a transformer including a primary winding and a secondary winding;

plural diodes operatively coupled to said primary winding;

plural diodes operatively coupled to said secondary winding to effect rectification;

a single power switching device operatively coupled to said plural diodes of said primary winding;

an inductor operatively coupled to said secondary winding and said plural diodes; and a capacitor connected at the output in parallel with the load.

24. The apparatus of claim 23 wherein said inductor on the secondary having terminals connected to the cathode of each of the top bridge rectifier diodes; and the cathode of the top bridge rectifier diode attached to the negative polarity of the secondary winding of the transformer further connecting to the output capacitor to equally share in delivering energy to the load by the transformer and the inductor in the second phase of operation.

25. The power generator apparatus according to claim 23 wherein the duty cycle of said first phase at said first frequency is maintained constant corresponding to a given load and the second phase is continuously pulse-width modulated.

26. The power generator apparatus according to claim 23, wherein the second frequency is approximately an integer multiple of the first frequency.

27. The power generator apparatus according to claim 23, wherein the first phase of operation is approximately centered around a zero-crossing of the AC input waveform and wherein the second phase of operation is complementary thereto.

28. The power generator apparatus according to claim 19 in which the control means utilizes duty cycle control in conjunction with two discrete operating frequencies wherein the duty cycle in the first phase of operation is fixed for a fixed load and varies when the load varies.

29. The power generator apparatus according to claim 28 further comprising:

a transformer including a primary winding and a secondary winding;

plural diodes operatively coupled to said primary winding;

plural diodes operatively coupled to said secondary winding;

a single power switching device operatively coupled to said plural diodes of said primary winding;

an inductor operatively coupled to said secondary winding and said plural diodes; and a capacitor connected at the output in parallel with the load; wherein the converter apparatus operating in flyback mode with a fixed duty cycle corresponding to the given load, when the output voltage reflected back to the input is higher than the absolute value of the instantaneous AC input voltage and the converter apparatus operating in a combination of flyback and forward conversion modes, with pulse-width modulated duty cycle, when the output voltage reflected back to the input is lower than or equal to the absolute value of the instantaneous AC input voltage.

30. The power generator apparatus according to claim 29 wherein the total harmonic content (THC) in the AC input current is between 1% to 2%.

31. The power generator apparatus according to claim 19 wherein the control means is integrated into an integrated circuit or a compact hybrid circuit to define a compact intelligent module.

32. The power generator apparatus according to claim 19 wherein the control means employs a control scheme which continuously compares the AC input with the regulated output to effect power control function between operating in a first phase at a first frequency when the output reflected back to the input is higher than the absolute value of the AC input and operating in a second phase wherein the operating frequency transitioning from said first frequency to a second frequency when the output reflected back to the input is lower than the instantaneous AC input within a cycle.

33. The power generator according to claim 32 wherein the first phase is operated in flyback mode and the second phase is operated in a combination of flyback mode and forward mode.

34. The power generator according to claim 32 wherein said apparatus is continuously operated in the flyback mode.

35. The power converter apparatus according to claim 21 wherein the input to output transformation is adjusted to have high current and low voltage capability suitable for charging batteries.

36. A method for AC-to-DC power conversion comprising:
inputting AC Power at a predetermined AC frequency and voltage $V_{ac}$;
full-wave rectifying the input AC power to produce a full-wave rectified voltage $V_i$ having an amplitude proportional to absolute value $V_{ac}$;
applying voltage $V_i$ across a primary of a transformer in series with a gate-controlled switch to produce a current $I_M$;
coupling a secondary of the transformer to an output rectifying bridge to produce a regulated output voltage $V_o$ across an output capacitor $C_o$ to a load;
comparing input voltage $V_i$ with a voltage $V_o'$ where $V_o'=V_o(N1/N2)$ and $N1/N2$ is the inverse turns ratio of the transformer;
if $V_i$ is less than $V_o'$, then clocking the gate-controlled switch at a first fixed frequency $f_1$, so that current $I_M$ is a discontinuous flyback current; and
if $V_i$ is greater than $V_o'$, then clocking the gate-controlled switch at a second fixed frequency $f_2$, where $f_2$ is unequal to $f_1$ and the current $I_M$ is a discontinuous flyback and forward current.

37. A method according to claim 36, in which $f_2$ is greater than $f_1$.

38. A method according to claim 36, in which $f_2$ is approximately an integer multiple of $f_1$.

39. A method according to claim 36, in which, when clocking at $f_1$ and for an invariant load, the switch is clocked at a fixed duty ratio.

40. A method according to claim 39 in which the duty cycle has a maximum of 50 percent.

41. A method according to claim 36, in which, when clocking at $f_1$, and for a load which is increasing, the switch is clocked at a proportionately increasing duty ratio.

42. A method according to claim 41 in which the duty cycle has a maximum of 50 percent.

43. A method according to claim 36, in which, when clocking at $f_1$, as $V_i$ increases, the current $I_M$ has an average in the discontinuous flyback current which increases proportionately to voltage $V_i$.

44. A method according to claim 36, in which, when clocking at $f_2$, the switch is clocked at a duty cycle which is continuously pulse-width modulated with pulses whose duty ratio D is proportionate to the square root of $1/(A+B/V_I)$ where A and B are constants dependent on primary and secondary inductance values, the transformer turns ratio and the output voltage.

45. A method according to claim 44, in which the maximum duty ratio is 50 percent.

46. A method according to claim 36, in which the output rectifying bridge includes an inductor positioned in series with the secondary of the positive polarity terminal of the transformer through a diode to store and discharge energy during a forward mode of operation of the bridge.

47. A method according to claim 46, in which an inductance L of the inductor is proportioned to an inductance $L_1$ of the primary of the transformer to apportion energy supplied to the load between the inductor and the transformer.

48. A method according to claim 46, in which the frequency $f_2$ is selected in proportion to one or more of the size and rating of the transformer.

49. A method according to claim 36, in which the comparing step between $V_i$ and $V_o'$ during each cycle of the input AC power alternates the clocking frequency between two discrete values $f_1$ and $f_2$ to synthesize the regulated output voltage $V_o$ in relation to a reference voltage.

50. A method according to claim 46, in which the load is a reactive load and the inductor and transformer are proportioned so that a power factor as seen by the input AC power is close to unity.

51. A method according to claim 36 including, during valleys of the rectified input AC voltage, operating in flyback mode with a fixed duty cycle and a fixed first frequency at a given load with a maximum duty cycle of 50% at full load, and when the rectified input AC voltage exceeds the reflected output voltage, operating in flyback as well as the forward conversion mode at the second fixed frequency which is a multiple of the first frequency while modulating the duty cycle continuously.

52. A method according to claim 36, in which, when operating at the second frequency $f_2$ the switch is clocked at a duty cycle which is continuously pulse-width modulated with pulses whose duty ratio D is in accordance to Equation (39)

$$D = \sqrt{\frac{V_m \sin\theta}{8\left\{2.5V_m\sin\theta - 2\left(\frac{N_1}{N_2}\right)V_0\right\}}}.$$

53. Power generator apparatus for converting an alternating current (AC) input to a direct current (DC) output, the apparatus comprising:
a clock generator;
a power switching device gated by the clock generator and coupled to the alternating current (AC) input to generate regulated DC output power;
a memory device storing digitized reference data; and
means for comparing the alternating current (AC) input and DC output to effect power circuit function between operating in a first phase at a first frequency and operating in a second phase at a second frequency, wherein said first phase at said first frequency is operating in flyback mode and said second phase is operating in both flyback and forward conversion mode;
said reference data in said memory device being used to continuously pulse-width modulate (PWM) a duty cycle of a gating signal from the clock generator to the power switch during said second phase.

54. Power generator apparatus for converting an alternating current (AC) input to a direct current (DC) output, the apparatus comprising:
- a clock generator;
- a power switching device gated by the clock generator and coupled to the alternating current (AC) input to generate regulated DC output power;
- a memory device storing digitized reference data; and
- means for comparing the alternating current (AC) input and DC output to effect power circuit function between operating in a first phase at a first frequency and operating in a second phase at a second frequency; and
- means for switching from a fixed duty ratio to a continuously pulse-width modulated (PWM) duty ratio of the gating signal and in transitioning from a first frequency to a second frequency, wherein the means for switching in transitioning from the first frequency to the second frequency in the second phase includes means for comparing a rectified input AC voltage and a reference point FCOP to minimize distortion and maintain near unity power factor;
- said reference data in said memory device being used to continuously pulse-width modulate (PWM) a duty cycle of a gating signal from the clock generator to the power switch during said second phase.

55. Power generator apparatus for converting an alternating current (AC) input to a direct current (DC) output, the apparatus comprising:
- a clock generator;
- a power switching device gated by the clock generator and coupled to the alternating current (AC) input to generate regulated DC output power;
- a memory device storing digitized reference data;
- means for comparing the alternating current (AC) input and DC output to effect power circuit function between operating in a first phase at a first frequency and operating in a second phase at a second frequency; and
- means for switching from a fixed duty ratio to a continuously pulse-width modulated (PWM) duty ratio of the gating signal and in transitioning from a first frequency to a second frequency, the switching means including controls operable such that said first phase of operation is when the value of the output voltage reflected back to the input is higher than the absolute value of the instantaneous AC input voltage and said second phase of operation is when the value of the output voltage reflected back to the input is lower than or equal to the absolute value of the instantaneous AC input voltage, wherein during said second phase the operating frequency transitioning from said first frequency to said second frequency is higher than said first frequency;
- said reference data in said memory device being used to continuously pulse-width modulate (PWM) a duty cycle of a gating signal from the clock generator to the power switch during said second phase.

56. Power generator apparatus for converting an alternating current (AC) input to a direct current (DC) output, the apparatus comprising:
- a clock generator;
- a power switching device gated by the clock generator and coupled to the alternating current (AC) input to generate regulated DC output power;
- a memory device storing digitized reference data;
- means for comparing the alternating current (AC) input and DC output to effect power circuit function between operating in a first phase at a first frequency and operating in a second phase at a second frequency;
- said reference data in said memory device being used to continuously pulse-width modulate (PWM) a duty cycle of a gating signal from the clock generator to the power switch during said second phase;
- a transformer including a primary winding in series with the power switching device and a secondary winding;
- plural diodes operatively coupled to said primary winding to effect rectification of the AC input;
- plural diodes operatively coupled to said secondary winding to perform a rectification function on the output of the secondary winding;
- an inductor operatively coupled to the output of said plural diodes operatively coupled to said secondary winding; and
- a capacitor across the output to be connected in parallel with the load.

* * * * *